Figure 1:
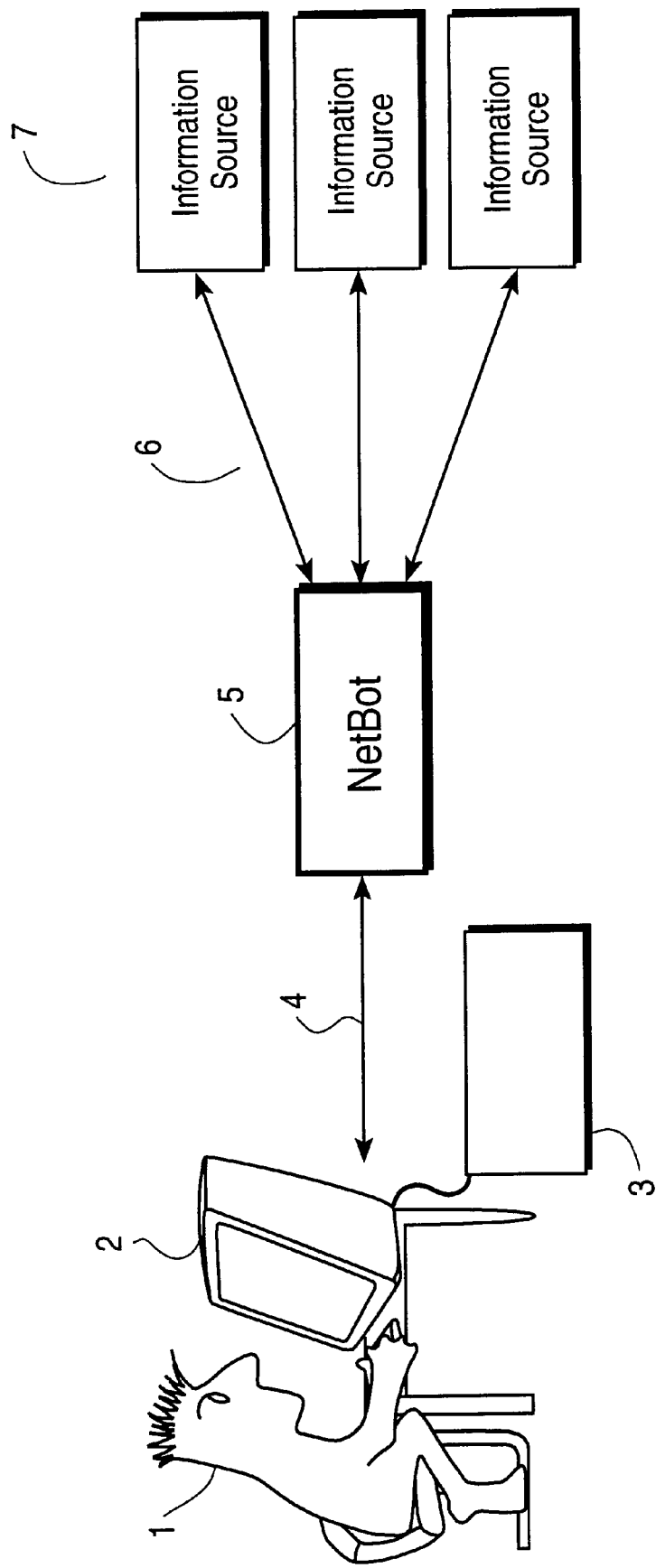

United States Patent [19]

Christianson et al.

[11] Patent Number: 6,102,969

[45] Date of Patent: Aug. 15, 2000

[54] METHOD AND SYSTEM USING INFORMATION WRITTEN IN A WRAPPER DESCRIPTION LANGUAGE TO EXECUTE QUERY ON A NETWORK

[75] Inventors: David Christianson; Robert B. Doorenbos; Oren Etzioni; Chung Kwok; Gregory Lauckhart; Erik Selberg; Daniel S. Weld, all of Seattle, Wash.

[73] Assignee: Netbot, Inc., Seattle, Wash.

[21] Appl. No.: 09/310,899

[22] Filed: May 12, 1999

Related U.S. Application Data

[63] Continuation of application No. 08/933,782, Sep. 19, 1997
[60] Provisional application No. 60/025,304, Sep. 20, 1996.

[51] Int. Cl.[7] .................................................. G06F 17/30
[52] U.S. Cl. ............................ 717/8; 707/2; 707/10; 707/103; 707/513; 717/7
[58] Field of Search ........................ 707/1–9, 100–104, 707/200–205; 717/1–11

[56] References Cited

U.S. PATENT DOCUMENTS

| | | | |
|---|---|---|---|
| 5,495,409 | 2/1996 | Kanno ........................................ | 700/49 |
| 5,600,831 | 2/1997 | Levy et al. .................................. | 707/2 |
| 5,680,619 | 10/1997 | Gudmundson et al. ..................... | 717/1 |
| 5,721,908 | 2/1998 | Lagarde et al. ............................ | 707/10 |
| 5,724,567 | 3/1998 | Rose et al. ................................. | 707/2 |
| 5,761,436 | 6/1998 | Nielsen .................................. | 709/245 |
| 5,768,578 | 6/1998 | Kirk et al. .............................. | 707/100 |
| 5,801,689 | 9/1998 | Huntsman ................................ | 345/329 |
| 5,826,258 | 10/1998 | Gupta et al. ................................ | 707/4 |
| 5,889,992 | 12/1999 | Koerber ...................................... | 717/2 |
| 5,913,214 | 6/1999 | Madnick et al. ........................... | 707/10 |
| 6,006,224 | 12/1999 | McComb et al. ............................. | 707/5 |

OTHER PUBLICATIONS

Arens, Y., Knoblock, C.A., and Shen, W., Query Reformulation for Dynamic Information Integration, *Journal of Intelligent Information Systems*, vol. 6, #2/3, 1996, pp. 99–130.

Bowman, C.M., Danzig, P.B., Hardy, D.R., Manber, U., and Schwartz, M.F., "The Harvest Information Discovery and Access System", *Computer Networks and ISDN Systems*, vol. 28, 1995, pp. 119–125.

Bowman, C.M., Danzig, P.B., Hardy, D.R., Manber, U., Schwartz, M.F., and Wessels, D.P., "Harvest: A Scalable, Customizable Discovery and Access System", *Technical Report CU–CS–732–94*, Mar. 12, 1995, pp. 1–29.

Burke, R., Hammond, D., and Kozlovsky, J., "Knowledge–Based Information Retrieval from Semi–Structured Text", AAAJ Fall Symposium on AI Application in Knowledge Navigation and Retrieval, 1995, pp. 19–24.

Cheong, F.C., "Internet Agents: Spiders, Wanderers, Brokers, and 'Bots", *New Riders*, 1996, pp. 76–78, 338–345, 348–350, 352–353.

(List continued on next page.)

*Primary Examiner*—Jack M. Choules
*Assistant Examiner*—Srirama Channavajjala
*Attorney, Agent, or Firm*—Fenwick & West LLP

[57] ABSTRACT

This invention provides assistance to a user in accessing network attached information sources. In one aspect, the invention is a method for intelligently routing a user query to information sources relevant to that query, extracting relevant data fields from received responses, and intelligently presenting the extracted data in order of estimated relevance. The system of this invention implements one or more steps of the method in a centralized or distributed manner on one or more network attached computers. Further, this invention provides a novel language and implementation that facilitates easily written and maintained descriptions of information source query and response formats.

4 Claims, 5 Drawing Sheets

OTHER PUBLICATIONS

Doorenbos, R.B., Etzioni, O., and Weld, D.S., "A Scalable Comparison–Shopping Agent for the World–Wide Web", *Technical Report UW–CSE–96–01–03*, Jan., 1996, pp. 1–20.

Dreilinger, D.E., "Description and Evaluation of a Meta–Search Agent", M.S. *Thesis*, Summer 1996, pp. 1–57.

Fikes, R., Engelmore. R., Farquhar, A., and Pratt, W., "Network–Based Information Brokers", AAAI 1995 Spring Symposium on Information Gathering from Heterogeneous, Distributed Environments, Mar. 27–29, 1995, Stanford University, California, pp. 52–56.

Hammond, K.J., Burke, R., and Schmitt, K., "A Case–Based Approach to Knowledge Navigation", Working Papers of the AAAJ Workshop on Multi–Media and Artificial Intelligence. Jul., 1994. Seattle, Washington, pp. 1–11.

Levy, A.Y., Rajaraman, A., and Ordille, J.J., "Query–Answering Algorithms for Information Agents", AAAI 96 Paper, Aug. 4–8, 1996, Portland, Oregon, pp. 1–8.

Monge, A.E. and Elkan, C.P., "Integrating External Information Sources to Guide Worldwide Web Information Retrieval", AAAJ 1995 Fall Symposium on Knowledge Navigation and Retrieval, Oct. 1995, pp. 1–12.

Perkowitz, M., and Etzioni, O., "Category Translation: Learning to Understand Information on the Internet", IJCAJ–95 Paper, Aug. 20–25, 1995, Montreal, Canada, pp. 930–936.

Steier, D., Huffman, S.B., and Hamscher, W.C., "Meta–Information for Knowledge Navigation and Retrieval: What's In There", AAAI 1995 Fall Symposium on AI Applications in Knowledge Navigation and Retrieval, 1995, pp. 1–4.

Rajasekar, A, String–oriented databases, IEEE String Processing and Information retrieval symposium, 1999 and international workshop on Groupware, and 158–167, Sep. 1999.

Merrill E. Isenman et al., Performance and architectural issues for string matching, IEEE transactions on computers, vol. 39, No.2, and 238–250, Sep. 1999.

Yuwono, B et al., Search and ranking algorithms for locating resources on the world weide web, IEEE Data engineering, 1996 proceedings of the twelfth international conference , and 164–171, Mar. 1996.

Almasi, G et al., Web*—a technology to make information available on the Web, Infrastrure for collaborative enterprises, 1995 proceedings of the fourth workshop , and 147–153, Apr. 1995.

Pazandak, P et al., Interactive multi–user multimedia environments on the Internet: an overview of DAMSEL and its implementation, Multimedia computing and systems, 1996, proceedings of the third IEEE international conference , and 287–290, Sep. 1999.

METHOD AND SYSTEM USING INFORMATION WRITTEN IN A WRAPPER DESCRIPTION LANGUAGE TO EXECUTE QUERY ON A NETWORK

This application is a continuation of U.S. Ser. No. 08/933,782 filed on Sep. 19, 1997, pending, the contents of which are hereby incorporated by reference, which is a continuation of provisional application Ser. No. 60/025,304 filed Sep. 20, 1996, also incorporated by reference herein.

1. FIELD OF THE INVENTION

The field of this invention relates to information access over networks, and specifically to the automatic location and evaluation of relevant information available over public or private networks from information sources in response to user queries.

2. BACKGROUND

The exponential growth of private intranets and the public Internet has produced a daunting labyrinth of increasingly numerous documents, databases and utilities. Almost any type of information is now available somewhere, but most users cannot find what they seek, and even expert users waste copious time and effort searching for appropriate information sources. One problem is simply the increasingly large number of available information sources that are beyond the comprehension of a single user. A second problem, along with this growth in available information and information sources, is a commensurate growth in software utilities and methods to manage, access, and present this information. Each utility has a different and often unique interface and set of commands and capabilities, and is appropriate for a different set of users and a different set of information types and sources. Thus sheer diversity of available utilities creates problem for users comparable to that created by information explosion. Users are now faced with the twin problems of which tool to use to inquire at which information source.

In the past efforts have been made to provide users with automatic, computer assisted services that can help solve these twin problems of the network revolution. For example, AI researchers have created several prototype software agents that help users with e-mail and netnews filtering (Pattie Maes et al., 1993, Learning interface agents, *Proceedings of AAAI-93*), agents that assist with World Wide Web browsing (H. Lieberman, 1995, Letizia: An agent that assists web browsing, *Proc. 15th Int. Joint Conf. on A.I.* pp. 924–929; Robert Armstrong et al., 1992, Webwatcher: A learning apprentice for the world wide web, *Working Notes of the AAAI Spring Symposium: Information Gathering from Heterogeneous, Distributed Environments*, pp. 6–12, Stanford University, AAAI Press), agents that schedule meetings (Lisa Dent et al., 1992, A personal learning apprentice, *Proc. 10th Nat. Conf. on A.I.*, pp. 96–103; Pattie Maes, 1994, Agents that reduce work and information overload, Comm. of the ACM 37(7):31–40, 146; Tom Mitchell et al., 1994, Experience with a learning personal assistant, *Comm. of the ACM* 37(7):81–91), and agents that perform internet-related tasks (0. Etzioni et al., 1994, A softbot-based interface to the internet, *CACM*, 37(7):72–75). Increasingly, the information such agents need to access is available on the World Wide Web. Unfortunately, even a domain as standardized as the WWW has turned out to pose significant problems for automatic software agents. For one, although Web pages are universally written in Hypertext Markup Language ("HTML"), this language merely defines the format of information display, making no attempt to hint at its meaning or semantic content. Currently, no accepted "semantic markup language" for the Web exits, nor is one likely to adopted universally. The Internet can be expected to pose even greater problems.

Thus, the advent of intranets, the Internet, and the World Wide Web have posed several fundamental problems for the automatic services or agents designed to assist users to find relevant information. First, no one such service has heretofore provided sufficient additional value to replace the use of a Web browser having access to existing directories and indices such as Yahoo or Lycos. Second, such services have not yet been able to understand and competently parse relevant information from the responses returned from a wide variety of Internet and Web information sources. Third, existing services and agents have not been easy to adapt to the ever-increasing numbers of sources with their ever-changing response formats. This is due to the individualized, hand-coded interface to each Internet service and Web site utilized by existing agents (Yigal Arens et al., 1993, Retrieving and integrating data from multiple information sources, *International Journal on Intelligent and Cooperative Information Systems* 2(2):127–158; 0. Etzioni et al., 1994, A softbot-based interface to the internet, *CACM* 37(7):72–75; B. Krulwich, 1995, Bargain finder agent prototype, Technical report, Anderson Consulting; Alon Y. Levy et al., 1995, Data model and query evaluation in global information systems, *Journal of Intelligent Information Systems, Special Issue on Networked Information Discovery and Retrieval* 5(2); Mike Perkowitz et al., 1995, Category translation: Learning to understand information on the internet, *Proc. 15th Int. Joint Conf. on A.I.*). Preferably, a service or agent should be able to access a new or changed Internet information source in order to automatically learn how to retrieve relevant information from the source. This would be advantageous even if such a facility were limited to groups of sources with response formats selected according to certain constraining principles.

3. SUMMARY OF THE INVENTION

It is a broad object of this invention to solve these fundamental problems by a method and system that provide a personalized network robot, called a "netbot." A netbot acts as a user's intelligent assistant by tracking available network information sources, knowing the relevant information and features of each particular source, and upon user request determining which sources are relevant to a given query, forwarding the query to the most relevant information sources, understanding the responses returned from each source, and integrating and intelligently presenting the query results to the user.

The netbots of this invention possess several advantages, including the following. First, a netbot returns only the most relevant information to the user. On the one hand, each user query is forwarded only to the primary information sources determined to be most relevant. On the other hand, information source responses are parsed and understood so that only the relevant data items are extracted for user presentation. Duplicate, stale, and irrelevant information items are discarded. Second, a netbot is fast. Since it automatically searches the relevant primary sources in parallel, it can present information as quickly as the fastest primary source returns a response. Despite changing conditions which cause different information sources to fluctuate in speed, a netbot integrator remains as fast as the fastest source. Sources that have no information to return to a query do not slow the user since the netbot simply ignores them. Third, netbots are easily adapted to the ever-increasing number of network information sources with ever-changing response formats. Netbots utilize a new and novel declarative language for describing information sources. A source description is short and easily understandable, and therefore is easily written and maintained.

Therefore, in one aspect the invention includes a method for efficient access to information sources on a network comprising preferably ana or more of the following steps: receiving a user query for information; determining the information sources most relevant to this query; retrieving a description of each information source; formatting the query according to this description in a manner suitable for each information source and transmitting the formatted query to the source; receiving responses from the information sources; for each source, understanding and extracting the relevant data fields according to the retrieved description; and presenting to the user the relevant data from each information source in an intelligent manner ranked by an estimate of its relevance. Advantageously, these steps are performed in parallel to the greatest extent possible. In particular, at least, all queries are transmitted to all relevant information sources in parallel without waiting for intervening responses.

In another aspect the invention comprises a computer system and apparatus for performing one or more steps of the method of this invention. The user has a presentation device attached to a network to which is also attached a plurality of information sources. The presentation device receives user queries and displays netbot responses. Further, the presentation device performs one or more of the steps of the method of this invention. One or more of those steps not performed on this device can advantageously be performed on network attached netbot server computers, which respond to functional requests from the user device. Optionally, the user device can range from a diskless hand-held terminal, to a PC, to a workstation, and so forth.

In a further aspect the invention comprises a new language and language implementation to facilitate the creation and maintenance of descriptions of information sources. Importantly, this language recognizes relevant data fields in responses returned from information sources and is capable of extracting all such fields. In the preferred embodiment this language has an action statement component and a regular expression component. The regular expression component has novel features for creating modular hierarchical descriptions of regular expressions, for binding variables to the correct sub-strings recognized during pattern match to a response of an information source, for performing arbitrary action language statements with multiple variable bindings, and for specifying backtrack free recognition of sub-strings where possible.

4. BRIEF DESCRIPTION OF THE DRAWINGS

Figure 2A:
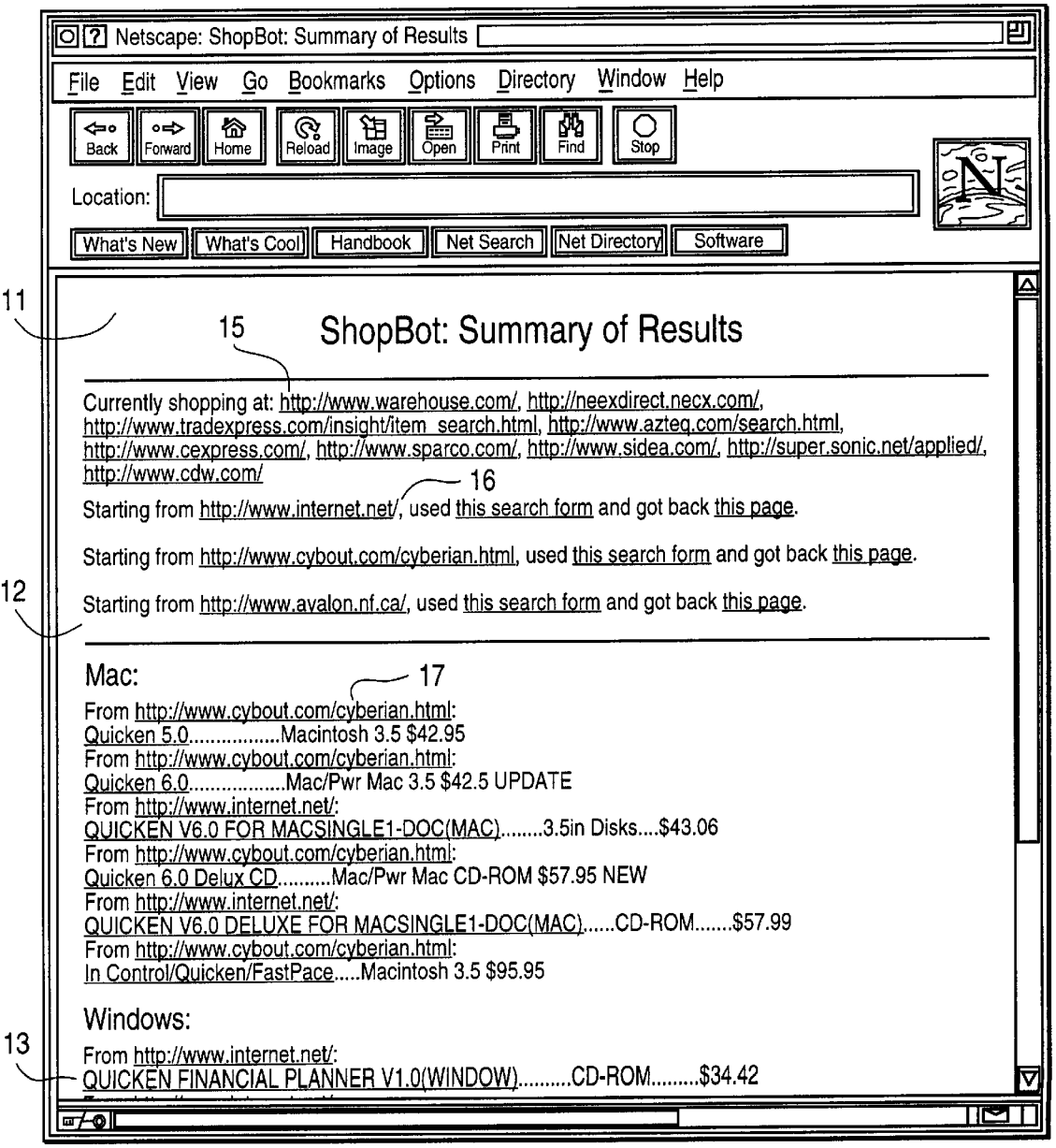
Figure 2B:
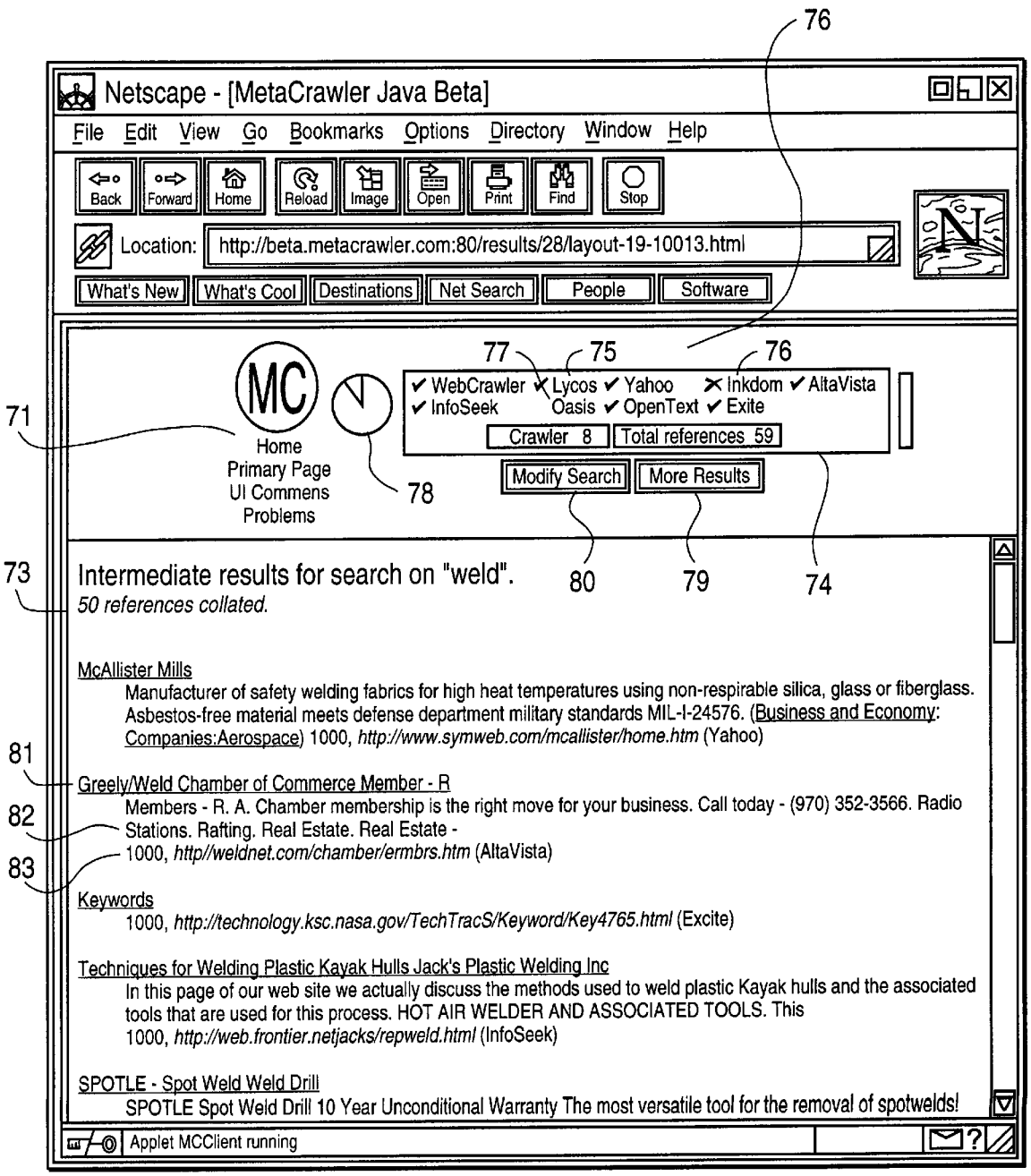
Figure 3:
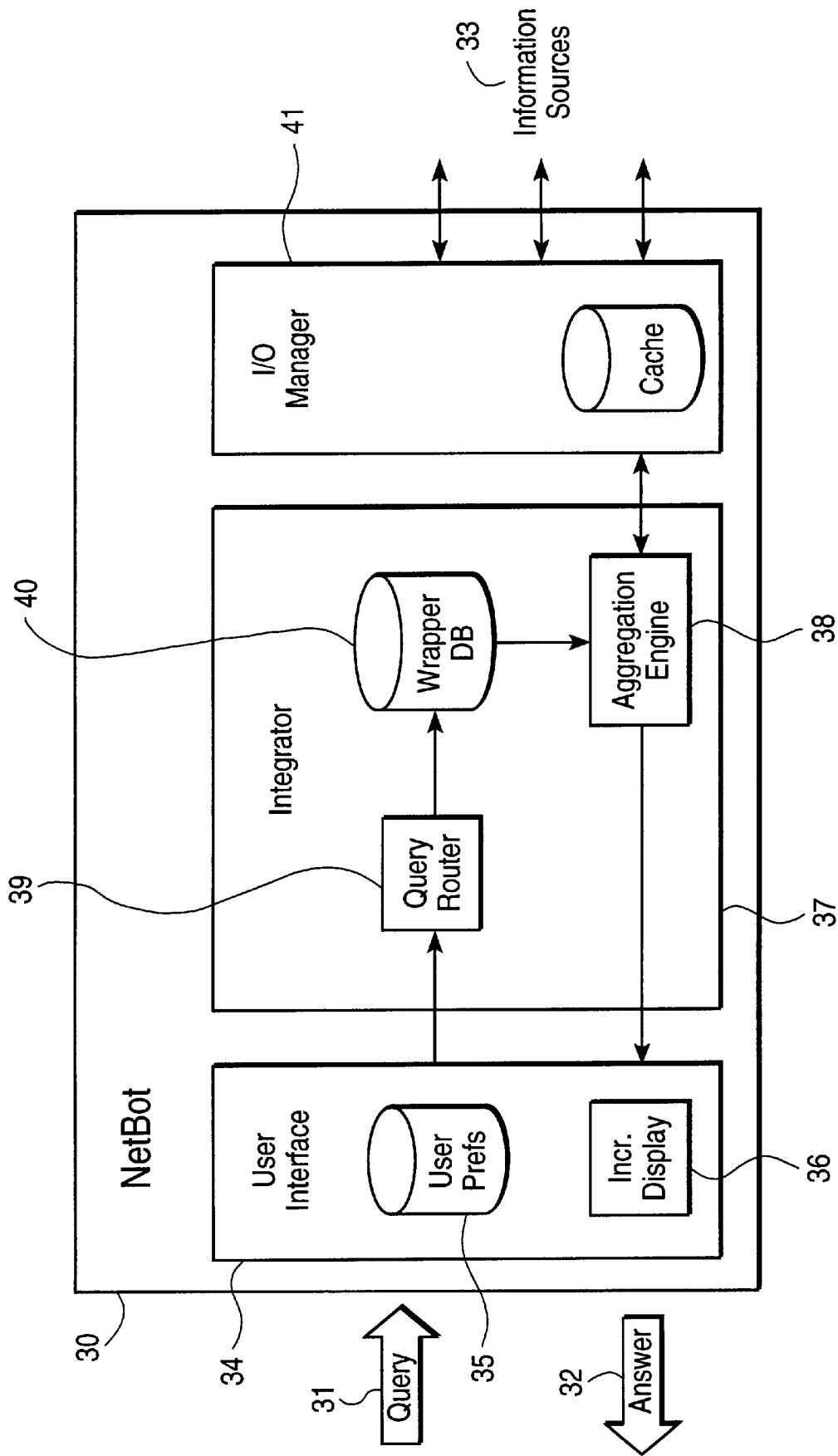
Figure 4:
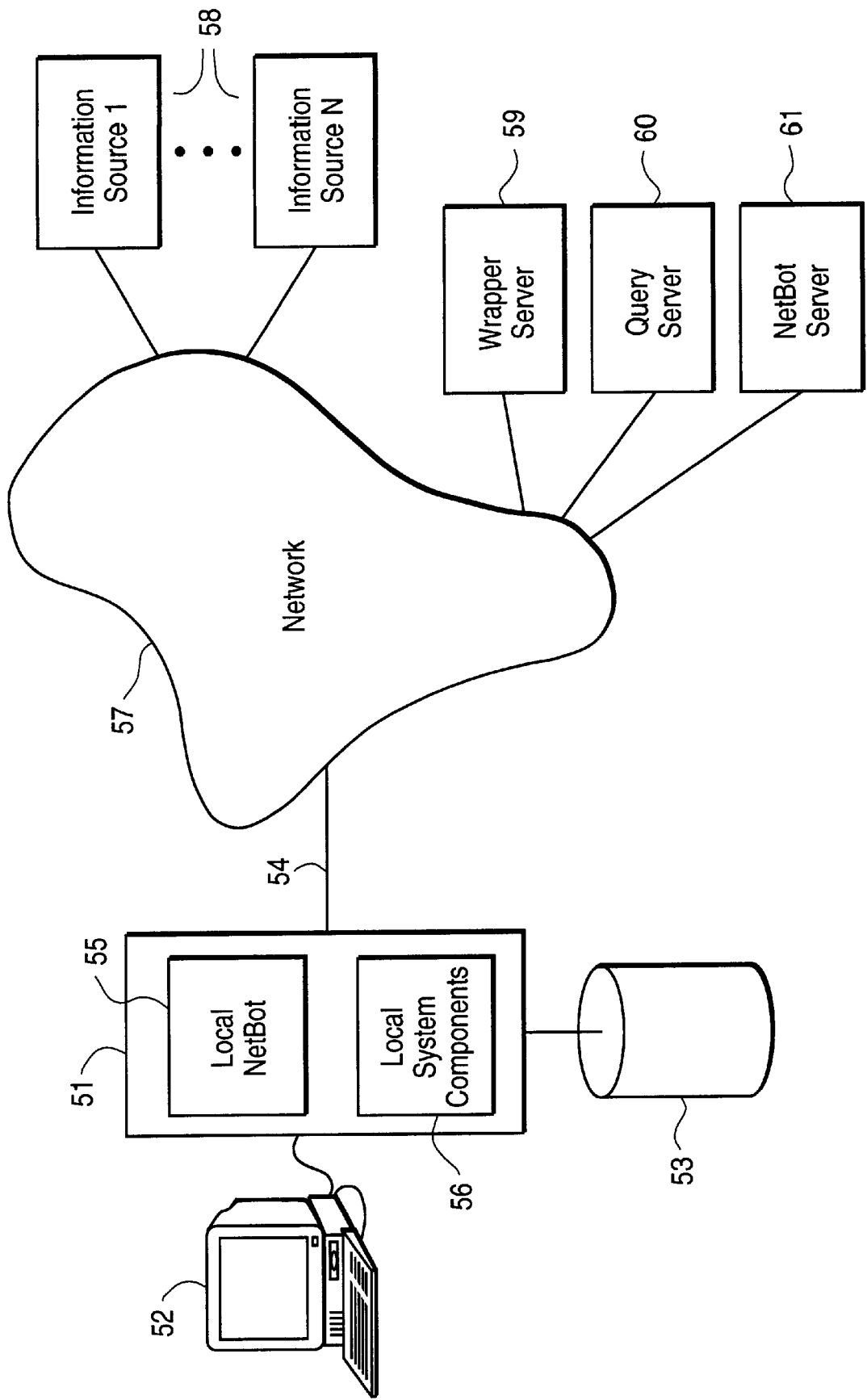

These and other features, aspects, and advantages of the present invention will become better understood by reference to the accompanying drawings, following description, and appended claims, where:

FIG. 1 illustrates generally a netbot of this invention;

FIGS. 2A–B illustrate exemplary user interfaces of embodiments of the netbot of FIG. 1;

FIG. 3 illustrates exemplary functional components of the netbot of FIG. 1; and FIG. 4 illustrates alternative hardware embodiments of the netbot of FIG. 1.

5. DETAILED DESCRIPTION

For clarity of disclosure, and not by way of limitation, the detailed description of a netbot of this invention is presented as a method or process for network information access, as a system or apparatus implemented to perform that method, and as a novel language designed to assist in implementing this method and system.

In the following, first an overview of these aspects of the invention is presented followed, second, by a detailed discussion of individual components.

5.1. OVERVIEW OF NETBOT ARCHITECTURE

A netbot method or system of this invention comprises software and hardware facilities that function together in one or more network attached computers to assist a user in access to information present in network attached servers (known herein as "information sources"). FIG. 1 generally illustrates the relationships of a netbot to a user and to networked information sources. For example, user 1 accesses user computer 3 through standard interface devices, such as monitor 2. In the course of work, the user needs information from information sources 7, attached to the user computer through various network links, such as network links 4 and 6. Since the information sources are many, the user can benefit from assistance in finding needed information from relevant information sources. This assistance is provided by netbot 5, which maintains an awareness of available information sources and queries them through links 6 on behalf of, or as an agent of, the user. Alternatively, netbot 5 can partly or wholly reside on user computer 3 or be partially or wholly distributed on the network and accessed by the user through link 4.

Groups of sources 7 having similar sorts of information are grouped into conceptual classes called information domains. For example, one domain can be that of electronic stores for a particular product; another domain might include Internet indexes containing information on the keyword content of various World Wide Web ("WWW") pages.

In a preferred embodiment, the netbot is composed of three major functional modules: a user interface, an integrator, and an I/O manager. Briefly, the user interface module interacts with the user to receive user queries for information, and to format and present information responses received from the network attached information sources. Advantageously, the user interface is adapted to the specific information domain being accessed. The integrator module accepts a user query from the user interface module, selects relevant information sources, formats it for network transmission to each relevant information source, receives responses from these sources, understands these responses, and passes the relevant portions of the responses back to the user interface module for display to the user. The I/O manager module performs hardware, operating system, and network specific interfacing for the user interface and integrator modules so that porting a netbot to different hardware platforms, operating systems, or networks requires changes only in well-modularized code.

In particular alternative implementations, either or both of the user interface or the I/O manager modules may be absent. For example, the functions of these modules might be already performed by other operating system components. A netbot can be provide only one or more of the facilities disclosed without providing others. For example, in some embodiments, a netbot is useful that preforms query routing, alone or in combination with relevance ranking. In other embodiments, a netbot can simply format queries and understand responses. Further, additional modules may be present in or accessed by a netbot. For example, a learning module can be present which provides for a netbot to acquire automatically the characteristics of a new network information source. Finally, as is known to those of skill in the art, the functions performed by the described modules may be divided or grouped in alternative fashions among a greater or lesser number of modules.

In the absence of specific preferences, the processes of this invention can be implemented in complete procedural programming language, such as c, or a complete object oriented programming language, such as C++, on the disclosed hardware configurations.

The User Interface Module

In more detail, the user interface module has both important functionality that is common to netbot user interfaces, whatever the information domain to which netbots are directed, and also has adaptations to the particular information domain of a particular netbot. Turning first to the preferable common functions, one such is the ability to remember a user's preferences for interacting with a netbot. Such remembered preferences include, for example, whether a. netbot is to fetch pages in order to calculate their relevance itself, the number N or relevant information sources to query, display characteristics, etc. A second such common function is incremental display of information received from a query. Since each query usually causes a netbot to consult many independent information sources, results are often received at widely varying times. Immediate display of asynchronously received results would cause such undesirable effects as screen flicker or disorienting rearrangement of already displayed data. Incremental display accommodates, on the one hand, user desires to view information quickly with, on the other hand, user desires for a comprehensive view of all received information, sorted according to relevance.

The incremental display strategy preferably provides one or more windows on the user's screen with several defined views of the query satisfaction process along with certain common user controls, such as screen buttons, for manipulating these windows. In one window, the user interface module presents lists of the information sources being consulted with each source symbolically represented as, for example, a network address, an icon, or another compact screen representation. Then, as an answer is received from a particular source, its associated screen representation changes appearance, e.g., by changing intensity, changing color, etc. Also displayed is a count of the total number of unique information items received currently. Optionally, clicking on the screen representation of an information source opens a further window with either information about this information source, or a display of the responses received from it, or access to the information source over the network, etc.

One of the common controls is preferably implemented as a common show-me-button that when activated causes display of another window in which a list of all currently received responses is presented ranked according to their estimated relevance to the query. Another common control is preferably implemented as a more-button in this latter window that when activated, causes re-display of all prior data items merged with items newly received since the last window display. The newly received items are merged into the display list in order or relevance, and distinguished from prior items by, for example, their color or intensity so that the user can avoid scanning prior items again. Optionally, clicking on a data item opens a still further informational window giving either the source of the item, a display of the response containing the item, or access over the network to the source of the item, etc.

In addition to such common functions and controls, a netbot user interface module preferably implements specific designs, formatting, and fields suitable to the information domain for which it is designed. For example, a netbot for comparison shopping in an information domain of electronic stores on the Internet can have a particular interface presentation containing labeled fields for product name, model, and price. On the other hand a netbot for access to an information domain of online Internet indexes can have an interface with fields labeled with elements derived from the query.

In one netbot embodiment, most functions and modules reside on network attached servers which a user accesses remotely. For example, the user may access a netbot over the Internet with the World Wide Web protocols utilizing a web browser, such as Netscape. In this case the user interface builds HTML formatted pages which are transmitted over the network by the I/O manager. FIG. 2A generally illustrates the user display from an example of such an embodiment, which is further directed to the information domain of online, electronic software stores. The netbot display of FIG. 2A is divided into three sections. Section 11 is a title section generally indicating that this display has results from a netbot for shopping, a "ShopBot." A netbot preferably also has a specific input query screen. Section 12 presents the list of online stores currently being consulted represented by their WWW addresses 15, which are selectable to provide further information or direct WWW access. At 16 in section 12, those sources which have already returned query results are similarly represented. Section 13 presents the results received so far formatted in accordance with this particular information domain into sections for the major PC operating systems. Each individual item returned, for example item 16, is formatted with product name, price, and an address for the originating information source. In this implementation, information display is controlled with the window scrolling and control facilities built into the web browser. This user interface is implemented as a HTML formatted page created at a netbot server and transmitted to the web browser.

FIG. 2B generally illustrates the user display from another example of a web-browser-based user interface embodiment, which in this case, is directed to an information domain of WWW indexes or search engines. This display is also generally divided into three sections. Section 71 displays a title for the netbot; section 72 displays the status of the current search; and section 73 displays the search results. In more detail, the display of section 71 includes a logo for this netbot, "MC" standing for "MetaCrawler," a name chosen since WWW search engines are also known as "web crawlers," and controls to access certain. system level presentation features, such the MetaCrawler home page and user feedback pages. The display of section 72 includes list 74 of the search engines being queried identified by their common names, the status of the current query in general and at each search engine, and common user controls. Generally, pie-chart icon 78 summarizes that 7 of the 8 search engines queried have already responded to the query. At search engine 75, known as "Lycos," the check mark indicates that a response containing information items has already been received. At search engine 76, known as "Inktomi," the cross mark indicates that a response without any information items has already been received. On the other hand, search engine 77, known as "Galaxy," is visibly distinguished from the other search engines to indicate that it has not yet responded to the query. The common controls of section 72 include more-button 79 to request the display of newly arrived search results, and modify-search-button 80 to request a new or modified query be sent. Lastly, the display of section 73 includes the information items returned from the search engines. Each information item is displayed separately and includes title 81, descriptive text 82 if available, and line 83 with the URL of the web page for this item and the estimated relevance of this item to the query, here "1000."The items are sorted for display by descending values of the estimated relevance. The displayed items are scrolled using controls provided by the web browser. This user interface is implemented as a Java applet downloaded from a netbot server and executed by the web-browser. In this manner, the interface of FIG. 2B is capable of greater interactivity than that of FIG. 2A. For example, it can poll the netbot server for current search status and update the status displays accordingly without user action.

Although the user interface is described primarily in terms of windows and buttons, one of skill in the art will recognize that this invention is adaptable to other display paradigms that provide for display of information and input of user commands. For example, the user interface module can control the entire screen and present graphical displays without intervention of a windowing system.

The user interface module is preferentially implemented with an object orient programming language supplemented with a class library providing windowing functions. A preferable implementation uses the Java language together with the java.awt package. See, for example, Flanagan, 1996, *Java In A Nutshell*, O'Reilly & Associates, sections 5 and 19.

The Integrator Module

FIG. 3 illustrates the preferred functional modules, data bases, and their functional interrelationship of netbot 30 in general and of an integrator module 37 in particular. The integrator preferably consists of three functions: a query router 39, a wrapper database 40, and an aggregation engine 38. These components are introduced here and described in detail in the following. Given user query 31 delivered from user interface module 34, the integrator first calls query router 39 to rank the network information sources known to a netbot in order of relevance and to return the N more relevant sources. Next the integrator retrieves the N wrappers for the N most relevant sources from wrapper database 40. These wrappers, which are descriptions of the information source and its requirements, are written in the wrapper description language of this invention. The retrieved wrappers are used by aggregation engine 38, first, to format the query into forms recognized by each information source, and second, to understand the information returned by each information source 33 in order to eliminate extraneous formatting matter and to put the received information into a common format. This formatted information is then aggregated and passed to the user interface module for presentation 32 to the user according to preferred incremental display method 36. The user display is also controlled by stored user preferences 35.

The Query Router

A well-behaved netbot should preferably use scarce network bandwidth and information source processing resources in a competent and efficient and frugal manner, while at the same time best answering each user query. Such behavior minimizes resource usage, and thus achieves best overall performance, both for the individual netbot and for all netbots functioning simultaneously on a network.

The query router is important to achieving this behavior because it permits the netbot to send requests only to information sources likely to have information relevant to a query. From a user query, the query router determines the relevance of each information source to the given query and returns the N most relevant sources. N is a parameter controllable at user preference and can be as small as 1. This relevance determination is preferably over inclusive rather than under inclusive. Occasionally including an irrelevant information source is preferable to missing a relevant and important source. Further, it is preferable that this relevance determination be quick to compute, not requiring costly processing techniques.

In a preferred embodiment, the query router calculates a numerical relevance rank value for each information source that estimates the source's relevance. This calculation is based on the concept of "conceptual classes." Thus each information source is tagged in advance with the conceptual classes for which it is relevant. Then the query router maps each query to the conceptual classes relevant to it, and finds information sources with conceptual classes shared by the query. The mapping of a query to its conceptual classes is preferably done with a hash function.

Aggregation Engine

The aggregation engine is the coordinating function of the integrator module. It receives the user query from the user interface module and requests the query router to provide a list of the N information sources most relevant to the given query. Then it retrieves the N wrappers for the N information sources from the wrapper database. Guided by the N wrappers, the aggregation engine translates the query into the request formats accepted by each of the N information sources and transfers the N requests to the I/O manager for network transmission. For some sources, the query may be in the format of a form to be returned. When a response is received from an information source, the aggregation engine, again guided by the appropriate wrapper, extracts data from the response and places it into a list of data fields, called a tuple format, relevant to the particular information domain. Optionally, each tuple can be assigned a priority order using a method appropriate to the particular information domain. Finally when the incremental display manager requests data to present to the user, perhaps in response to a more-button request, the aggregation engine passes the tuples to the user interface module, sorted in priority order if a priority is determined For example, if the information domain relates to Internet online software vendors, then the tuples optionally contain such relevant fields as product name, manufacturer, software version number, operating system required, price, etc. An exemplary priority order of the tuples can be by price, by delivery delay, or other factor at user preference.

For a further example, if the information domain relates to World Wide Web ("WWW") search engines, which index information pages available generally on the WWW, then the tuples optionally contain such relevant fields as title of the indexed page, the universal resource locator ("URL") of that page, relevance scores estimating the relation of the indexed page to the query, descriptive text, etc. An exemplary priority order can be based on the netbot's normalized estimate of the relevance of the indexed page to the query. If the netbot does not retrieve the indexed page, then it sums the normalized relevance estimates for this response that are returned from each of the search engines. If a search engine does not return a relevance estimate, a default value is used. The obtained relevance estimates are then normalized by linearly adjusting the returned scores to have a common maximum of, e.g., 1000, and then multiplying the adjusted scores by a confidence factor. This confidence factor, ranging from 0 to 1, is a predetermined estimate of the reliability of d particular information sources own relevance estimates. For example, it can be determined by practical experience with the information source's relevance estimates. Alternately, the user can request the netbot to retrieve the page in order to do its own relevance estimate. In an exemplary embodiment, for queries requesting the presence either of all query words or of any query words, the estimate is determined by scanning the page and counting the number of query words actually present, and then scaling the count so that the presence of all words results in the common maximum relevance value. For queries requesting the presence of a phrase, the estimate is determined, for example, by subtracting from the common maximum a normalized sum of the square of the distance in the page of each word of the phrase from its successor word in the phrase. Thereby, if the phrase appears contiguously in the page the relevance is high, whereas if the words of the phrase are widely separated on the page, the relevance is low.

In summary, for the majority of information domains, the priority order is determined from a relevance computation, as in the WWW search engine example. However, for certain domains such as online software vendors, a priority order can be simply determined from the values of one or more numeric fields of the response tuples.

The Wrapper Database

The preferred manner of describing information sources and their capabilities, in particular their query formats and response formats, is with compact, modular, declarative descriptions called wrappers. Since a netbot can access from several hundred to many thousands of information sources, the descriptions of the sources are preferably compact, requiring a minimum of storage. Further, since new information sources are frequently created and existing sources frequently change their format, easy maintenance of source descriptions is important. A modular, declarative description, instead of a complex procedural description, facilitates such maintenance. In one embodiment of this invention, wrappers can be learned by a separate module for information sources having sufficiently regular formats.

For each information source, in an exemplary embodiment, each wrapper advantageously includes the following information:

1. The Universal Resource Locator ("URL") address of the information source;
2. The conceptual classes of the source;
3. A description of the mapping from query arguments, e.g. words or phrases, to fields of the query or HTML defined form used to interrogate the source (including site support for any, all, phrase, or proximity queries);
4. A description of the format of the query response or HTML page layout that enables parsing of relevant information from other information and extraneous formatting matter.

At least items 3 and 4 are advantageously written in the wrapper description language of this invention.

A netbot can retrieve wrappers in various manners. In one embodiment, the information source itself can supply its own wrapper upon request from a netbot. In an alternative embodiment, the netbot can provide its own wrappers in various manners. For example, wrappers can be built in the netbot itself, especially where the netbot accesses only a few information sources. Also, wrappers can be stored in a local database or can be downloaded on demand from a centralized database.

The wrapper description language (hereinafter referred to as the "WDL") of this invention facilitates the semantic description of queries, forms, and pages by using a declarative description format that combines features from grammars and regular expressions. Here an example of this description language is presented. A detailed description is set forth in a later section. Syntax used follows conventions known to those of skill in the art for specifying grammars, including regular expressions. See, e.g., Schwartz, 1993, *Learning Perl*, O'Reilly & Associates, Inc., chapter 7; Aho et al., 1986, *Compilers Principles, Techniques, and Tools*, Addison Wesley Publishing Co., section 3.3

An exemplary description in WDL of a typical page returned from an WWW search engine follows here. The WDL interpreter uses the page description to parse a page and to execute any specified action statements. Note that "stuff" is a reserved word in the WDL that matches any character string up to the first occurrence of a mandatory following string literal.

```
::= stuff "<dl>" <item>* .*$
<item>::= stuff "<dt>" stuff "=$"" (stuff) "$"><strong>"
         (stuff) "</strong></a>" stuff "<dd>" (stuff)
         "<br>" { output($0, $1, $2, 500) }
```

This describes a page made up of, among other data, a sequence of zero or more items. In detail, a page is specified to consist of stuff, then the string <dl>, then zero or more items, then zero or more characters ("."), then finally the end of the page ("$"). In general, an item includes three fields of relevance, denoted by (stuff) and referred to sequentially by $0, $1, and $2, that when an item is recognized are output by the "output( )" statement. In detail, an item is specified to consist of stuff, then the string <dt>, then more stuff, then the string '="', then the first field of interest later referred to by $0, then the string '"><strong>', then the second field of interest later referred to by $1, then the string "</strong></a>", then more stuff, then the string "<dd>", then the third field of interest later referred to by $2, then the string "<br>". The action statement within braces, in this case specifying output of the variables $0, $1, and $2 with the bindings when an <item> is matched, is executed when each item is recognized.

The Netbot System

The preferred functional structure of a netbot can be assigned to system hardware components in various alternatives. The preferred alternative in any case depends on which allocation of function achieves a rapid response and reasonable cost. FIG. 4 generally illustrates exemplary netbot hardware embodiments and options in view of the previous general description. It illustrates the interrelationship of user computer elements 51–56, network 57, information sources 58, and netbot server computers 59–61. Computer 51 is a user computer including a processor, memory, and various attached peripherals. Such peripherals include display device 52, or other device for user interaction, network attachment 54, optional hard disk storage 53, and so forth. Computer 51 can be alternatively a network device without permanent storage, a PC, a workstation, or more powerful computer. It is preferred that computer 51 be a PC or a workstation running one of the Windows operating systems, the Macintosh operating system, or UNIX. Present in the memory of user computer 51 is, among other software, local netbot software 55 and local system components 56. The local netbot software implements one of more of the netbot functions. The local system components can include, for example, a web browser.

Network 57 can be any network with a plurality of attached information sources 58, which are can be optionally conceptually classified by subject matter into information domains. In a preferred embodiment, network 57 is the public Internet or a private intranet supporting the TCP/IP suite of protocols, including such user level protocols as FTP, HTTP, and so forth. The information sources are server computers which make their stored information available using the protocols supported by network 57. Such information can include databases of periodicals, newspapers, etc., information on or produced by particular commercial, educational, or other types of organization, facilities for is electronic commerce, etc.

In such a network, a netbot can have various embodiments. In an entirely local embodiment, all netbot functions reside in local netbot software 55 on user computer 51, which in this embodiment must have sufficient processing and storage capabilities. In alternative embodiments, one or more of the disclosed netbot functions can be distributed on other network attached computers.

For example, computer 59 is a wrapper server for accepting requests for downloading wrappers from its wrapper database. The wrapper database can be stored in memory or on disk using any data management system capable of storing and retrieving compact textual descriptions. Computer 60 is a query server for performing query routing by accepting queries and returning the N most relevant information sources from the many tens or hundreds of thousands about which it stores information. Computer 61 is a netbot server for performing the integrator module function by accepting user queries and returning search results, perhaps using the facilities of wrapper server 59 and query server 60. With these network servers, local netbot software preferably only supports the user interface, which may be delegated entirely to a web browser. Alternately, it can further include the aggregation engine, which makes query routing requests to query server 59 and wrapper requests to wrapper server 60. Further, it can include one or both of these latter functions.

The various computers of a netbot system can be provided with software for performing the methods of this invention either from computer readable media or by loading across a network. This invention is adaptable to known magnetic and optic media, such as disks, tapes and CD-ROM.

5.2. THE I/O MANAGER

The I/O manager module performs hardware, operating system, and network specific interfacing for the integrator module. Network interfacing includes the tasks of sending requests and receiving responses from network attached information sources. An important application of the netbots of this invention is to information retrieval over the Internet. In this application the I/O manager is responsible for implementing the relevant protocols of the WWW, Gopher, FTP, Internet tools, etc. Optionally, it can temporarily cache pages and other data in order to improve response time.

Operating system interfacing includes the task of window management for the user interface module and access to the wrapper database, if present.

Preferably, the I/O manager is constructed from commercially available protocol stacks, windowing libraries, such as the Java.awt package, and other tools. In some implementations, more or less of the I/O manager functions can be performed by other system components on the network attached computer. Optionally, the I/O manager is designed to be scalable to multiple machines, to not require multi-threaded or reentrant code, and to be cross platform and persistent.

5.3. THE AGGREGATION ENGINE

In the preferred embodiment the functions previously identified for the aggregation engine component of this invention are performed by the following process. Searches of the information source proceed in parallel because all requests are transmitted without waiting for any responses.

1. Receive a user query from the user interface module;
2. Perform query routing to determine the N information sources most relevant to the user query;
3. For each of the N relevant information sources, do:
   A. Retrieve the wrapper for this information source (for example, from the source itself or from a local or remote wrapper database);
   B. Guided by the wrapper, format the user query into the form or format required by the information source;
   C. Transfer the translated command to the I/O module for transmission to the information source;
4. Initialize the list of responses to be empty;
5. Until a user specified time limit is reached, do:
   A. When an information source response has been received by the I/O module and transferred to the integrator, then:
      i. Guided by the wrapper for this information source, parse the response to understand the information returned, discard the site-specific formatting text and other irrelevant matter, and gather relevant fields into tuples;
      ii. Add each tuple to the list of tuples, optionally performing priority ranking, duplicate elimination, etc.;
   B. Wait for the next response;
6. Deliver the list of created tuples to the user interface module on request, which can be due, for example, to user activation of the show-me-button or more-button controls.

When multiple information sources are queried, it is preferable in step 6 to present to the user interface module, and thereby to the user, a single merged list of tuples extracted from the responses and sorted according to an estimate of the significance or relevance of each tuple to the user. Such a estimate is preferably made according to methods specific to the information domain to which the netbot is directed. For certain domains, a significance estimate can be made directly from the value of one or more data fields in the tuples. For example, in a domain of electronic shopping, significance can be related only to price or delivery date, according to user preference. For most domains, however, a significance estimate is made according to relevance of the returned information, which must be determined by examining the responses from each sources.

In a preferred embodiment of such a relevance determination, the user has the choice of whether or not to have the netbot examine all information pages itself. If the user so chooses, the relevance is determined by the netbot according to a domain specific Analyze function. In a domain of information queries, an exemplary Analyze function finds the number and location of query words in the returned response. For keyword queries, responses with more keywords present with greater frequency are more relevant. For phrase based queries, responses having the words of the phrase more closely spaced, for example in one sentence or even in contiguous sequence, are more relevant. In other domains, appropriate Analyze functions are provided.

If the user chooses not to have the netbot examine the responses, the netbot relies on relevance estimates returned from the information sources. If a particular source does not return a relevance estimate, a default value is used. These estimates are then normalized to be between, e.g., 0 and 1000, and multiplied by a confidence ranking factor. This confidence factor, ranging from 0 to 1, is a predetermined estimate of the reliability of a particular information source's own relevance estimates. For example, it can be determined by practical experience with the source's estimates. Where the same tuple is returned from two or more sources, the relevance values from all those sources are combined. Optionally, the relevance estimates returned from each source are adjusted to have a uniform distribution in the normalization range.

In a particular detailed embodiment, this determination is performed according to the following process. Here, query routing has determined a list of K information sources, source_k with k from 1 to K, and returned their confidence ranks, crank_k. Each of these sources has been queried, returned responses, and K lists of information tuples, tuples_j where j is from 1 to length_k, have been extracted from these responses. The user's preference for netbot analysis is recorded in verification flag V. The variable t.score represents the composite relevance score for tuple t; the variable t.sourcescore_k represents the relevance estimate returned from information source_k for the response that tuple t was extracted from.

```
Input:   List of K sources with their confidence rank pairs
         (source_k, crank_k), obtained from the query
         routing system; K ordered lists of tuples,
         tuples_k, of length length_k, obtained from source
         source_k; and the verification flag V (Boolean),
         obtained from user preferences
Output:  Merged list of all tuples sorted by relevance.
/* Main routine */
IF (V is true) THEN
    FOREACH k = 1 . . . K
      FOREACH tuple t n tuples_k
         page = the HTML page that tuple t points to,
            downloaded if necessary
         t.score = Analyze(page);,
ELSE /* V is false */
    FOREACH k = 1 . . . K
      NormalizeScores (tuples_k)
      AdjustByHeight (tuples_k)
      AdjustByServiceRanking(tuples_k)
      /* Merge result tuples, t, into MERGED_LIST and
      determine a composite relevance score, t.score, from the
      scores returned by the information sources,
      t.sourcescore_k; the same tuple returned from multiple
      sources has its composite score incremented by the
      source score from each source */
      FOREACH k = 1 . . . K
      FOREACH tuple t in tuples_k
         IF t is not in the MERGED_LIST THEN
            Add t to the MERGED_LIST
            t.score = t.sourcescore_k
         ELSE
            t.score = t.score + t.sourcescore_k
         ENDIF
ENDIF
SORT all tuples t by. t.score and discard duplicates
OUTPUT sorted tuples
EXIT /* finished relevance ranking */
/* Subroutines */
SUBROUTINE NormalizeScores (tuples_k)
/* If information source_k returns relevance estimates,
normalize them to fall in the range from 0 to 1000;
otherwise, use a default relevance estimate */
    /* "s" is the k'th information source's relevance score
    for the first tuple on the list of tuples from source_k
    */
    s = tuples_k[1].sourcescore_k
    IF (s == 0) THEN
      /* this information source returns no scores,
      therefore use default */
      FOREACH tuple t in tuples_k
         t.sourcescore_k = 1000
    ELSE
      scaling_factor = 1000.0 / s;
      FOREACH tuple t in tuples_k
         t.sourcescore_k = t.sourcescore_k *
            scaling factor;
    ENDIF
ENDSUB
SUBROUTINE AdjustByHeight (tuples_k)
/* Adjust the source scores to have a uniform percentile
distribution; for example for 10 tuples, the first tuple's.
source score is adjusted to 100% of its source score, the
second tuple's source score is adjusted to 90% of its source
score, etc. */
    percent_step = 100 / Length_k;
    percent_off = 0;
    FOREACH tuple t in tuples_k
      t.sourcescore_k = t.sourcescore_k * (100 −
      percent_off) / 100;
      percent_off = percent_off + percent_step;
ENDSUB
SUBROUTINE AdjustByServiceRanking (tuples_k)
/* Each Service is assigned a percentile ranking indicating
the confidence given to its returned source scores; this
ranking is used to scale the returned source scores for each
tuple; for example, a 90% confidence ranking means that each
source score is scaled by 0.9 */
    FOREACH tuple t in tuples_k
      t.sourcescore k = t.sourcescore_k * crank_k
ENDSUB
```

One of skill in the art will recognize that these processes are amenable to routine alterations and enhancements that perform the same functions in the same manners. In particular other values for the normalization range and default value for the information source relevance estimates can be used. This invention includes such routine alterations. These processes are preferably implemented in C++, but can alternatively be implemented in any procedural or object-oriented programming language.

5.4. THE QUERY ROUTER

The query router receives as input a user query expressed as a list of words or keywords and returns as output a list of N information sources ordered by their likely relevance to the input query. Determination of these information sources is optimized for speed and over inclusiveness. Occasionally including an irrelevant information source is preferably to omitting a relevant source.

The preferred query router is based on the principle of assigning relevant concepts to information sources and query words. In advance, a set of concepts is chosen to describe the information sources of the one or more information domains to which one or more netbots are directed. For each information source in the domains, the relevance of that source to each of the chosen concepts is judged. Further, each word that can appear in possible queries is examined to determine which of the chosen concepts are relevant to the word. Then, upon receiving the words or keywords of a query, the concepts associated with these words are determined, and then the information sources relevant to these concepts are found. The ranked relevance of each source is determined by combining the individual relevances of the source to all the concepts of the query. The case of phrase based queries is preferably handled by generating separate data for this query type.

The preferred implementation of this process utilizes four tables containing relevance information. In the following, W is chosen to be somewhat bigger, e.g. 10%, than the number of words that can appear in possible queries; C is the number of chosen concepts; and S is the number of information sources in the information domain. WORD2CONCEPT[ ] is a table of W vectors of C bits, where the C bits of the vector for a word indicate which of the C concepts are relevant to that word. CONCEPT2SOURCE[ ][ ] is a C by S table. For each of the C concepts and S sources, the corresponding entry of this table contains the relevance value of that source to that concept. For example, if entry <i,j> equals 5, the j-th information source has a relevance weight of 5 with respect to the i-th concept. CONCEPT2SOURCE[ ][ ] is used when searching by words. For searching by phrases, the table CONCEPT2PHRASE[ ][ ] similarly relates concepts to sources. Finally, DEFAULT-RELEVANCE[ ] has a default relevance weight for each of the S information sources.

The preferred implementation performs the following process.

1. For each of the S information sources, set RELEVANCE[j]=DEFAULT-RELEVANCE[j];
2. For each word in the user query, do:
   A. Compute a hash function on the word obtaining a number, M, between zero and W. Any suitable hash functions is adaptable to this process. An exemplary hash function is found in Sedgewick, 1990, *Algorithms in C*, Addison-Wesley Publishing Co., chapter 16.
   B. Let the C bit vector V equal to WORD2CONCEPT [M];
   C. Combine the relevances for all the concepts in V to the relevance for the information sources by performing:

```
For i from 0 to C. do:
   If (i-th bit of V is '1') THEN
       FOR j = 1 to S DO
           RELEVANCE[j] = RELEVANCE[j] +
               CONCEPT2SOURCE[i,j]
```

Monotonically increasing function other than "+" can also be used to combine the individual concept relevances into a final relevance;
   D. Combine the relevances for all the words in the user query, for example by adding them together.
3. In the case of searching by phrases, additionally do:
   A. Concatenate all the words of the user query phrase;
   B. Compute the hash function on the phrase and obtaining M, and set the C bit vector V equal WORD2CONCEPT[M];
   C. Combine the relevances for all the concepts in V to the relevance for the information sources by performing:

```
For i from 0 to C, do:
   If (i-th bit of V is '1') THEN
       FOR j = 1 to S DO
           RELEVANCE[j] = CONCEPT2PHRASE[i,j]
```

4. Sort information sources based on their RELEVANCE, and return the N most relevant sources.

One of skill in the art will recognize that this process is amenable to routine alterations and enhancements that performs the same functions in the same manner. This invention includes such routine alterations.

This process is preferably implemented in C++, but can alternatively be implemented in any procedural or object-oriented programming language. In the case of a query router which maintains information on a large number, e.g., tens of thousands, of information sources, the query router is preferably implemented as a server process on a server computer to accommodate the size of the required data structures and the processing requirements of query routing.

An exemplary construction of the table WORD2CONCEPT begins with the selection of concepts to characterize the information domain of interest and the determination of words and phrases likely to occur in user queries. For each concept, the following actions are performed. The words and phrases associated with that concept or to which the concept relates are assigned to the string arrays KEYS[ ] and PHRASES[ ]. Then the following process is carried out.

```
FOR i equals 1 to the number of elements in KEYS[ ], DO
   Apply the previously used hash function to KEYS[i]
       to obtain a number between 0 and W
   SET the bit matching the current concept in
       WORD2CONCEPT[M].
FOR j equals 1 to the number of elements in PHRASES[ ],
   DO
   Apply the previously used hash function to KEYS[i]
       to obtain a number between 0 and W
   SET the bit matching the current concept in
       WORD2CONCEPT[M].
```

These actions are repeated for each chosen concept. Alternatively, concept information can be stored along with the string information, using either open or closed hashing, in order to preserve accurate string to concept matching.

5.5. THE WRAPPER DEFINITION LANGUAGE

This section first presents introductory material on the use of the WDL in wrappers. Next, the two principal components of the WDL—the action language and the regular expression language—are described in detail. Finally, an exemplary embodiment of the WDL is presented.

A wrapper is a description of an information source and how a Netbot should interact with it, in particular how to format requests to it and how to understand responses from it. NetBots need to interact efficiently with hundreds to many thousands of information sites on a network. This interaction presents two requirements: first, compact storage of a description of an information source using a representation encoded in the WDL; and second, use of this description to understand the information source. Currently, for example, netbots need to format requests to a source and to parse useful information from the pages returned by the source while ignoring irrelevant formatting information. As information sources become more functional, netbots will need to process interactions more complex than simple request-response pairs. Therefore, wrappers and the WDL preferably have the following features:

1) WDL descriptions are easy to write, easier than, for example, in C++. This is important because new information sources are created frequently and existing services change their format frequently. Optionally, wrapper descriptions can be automatically generated using machine learning techniques in information domains where responses have a regular, predetermined format.
2) Wrapper description are small. This is important so they can, for example, be stored locally in a database or quickly transmitted from a server to a netbot running in a client, even over a slow network connection. Optionally, information sources can supply their own wrappers on request.

3) WDL descriptions can be automatically compiled into fast finite state automata that quickly parse the information returned by information sources.

4) Using wrappers with WDL permits netbots to adapt to new types of information formats and new types of information server interactions in the future.

The wrapper description preferably specifies at least two processes: first, requesting information from an information source, e.g., how to fetch the appropriate HTML formatted page from a source; and second, how to parse returned pages to extract the relevant data. To perform the first process, the WDL includes an action language component, which is an extensible language of expressions and statements. To perform the second process, the WDL includes a regular expression language component, which is an extensive and novel means of specifying regular expression pattern matching facilities.

In alternative implementations, netbots can utilize alternative pattern matching facilities known to those of skill in the art. For example, the regular expression component could be replaced with a context free language specification ("CFL"). In this case, implementation of the WDL can follow techniques known for construction of compiler compilers, for example YACC. However, where possible, regular expression pattern matching is preferred because of its straightforward specification and rapid execution.

An Example Of The Regular Expression component

Regular expressions are advantageous for describing the format of the information returned from many information sources. The regular expression component of the WDL augments prior regular expression matching facilities in several novel manners. First, it permits programming language facilities of the action language, e.g. statements and expressions, to be executed when regular expressions are recognized and with variable bindings as determined by partial matches recognized during the overall recognition. Second, the preferred implementation compiles regular expressions into compact and efficient finite state automata. Third, it encourages the efficient and intuitive expression of complex regular expression in a nested manner. And fourth, it possesses an efficient backtrack-free padding facility.

An exemplary wrapper follows which is suitable for an Internet information search engine and is written in the WDL. The significance of each portion is explained in comments, which are surrounded by "/*" and "*/."

/* A list of input query words is passed to the wrapper from the aggregation engine, which is executing the wrapper for the information source. The argv( ) function of the action language extracts a list of the input query words. */

{$keywords = argv(2);

/* The request to be sent to the information source is calculated by concatenating, indicated by the "." operator of the action language, three separate strings: one, the Internet URL address of information source and the initial query format string; two, the query words to search; and three, the remainder of the query format string for this information source; and */

```
$url  =  "http://searcher.source.com/searcher.cgi?query
         =" . $keywords . "&onlyrr=0";
```

/* The fetch action statement transfers this query the I/O module for network transmission, and then waits for the HTML formatted response. */

$page = fetch(0, $url,");

/* The HTML formatted response text is parsed using the following regular expression grammar. */}

$result = parse ($page, ); }

/* An response from this exemplary source consists of a page containing zero or more information items. This is hierarchically described in the regular expression language by expressions for  and <item>, where  refers to <item>s. In particular, a page includes a chunk of text followed by the string "results returned . . .", then followed by zero or more items. */

```
  ::=  stuff 'results returned, ranked by'
             <item> * END
```

/* Each item consists of irrelevant text, HTML formatting codes, and relevant data fields. The relevant data fields are enclosed in parentheses and referred to sequentially by $0, $1, and $2. These fields, along with the number 500, are output as a tuple when the "output" statement of the action language is executed upon recognition of an <item>. The particular meaning of the definition of <item> will become apparent in the next section. */

```
<item>  ::=  stuff '<hr>' stuff '<center><b><a href="'
             (stuff) '"' stuff '>' (stuff) '</a>'
             stuff '<font size=-1>' (stuff) '</font>'
             { output ($0, $1, $2, 500); } END
```

5.5.1. DESCRIPTION OF THE WDL COMPONENTS

This section describes the preferred features of the action language and the regular expression components of the WDL. This invention is not limited to the descriptions presented. These descriptions make use of known methods for describing grammars, including regular expressions, and one of skill in the art will recognize that there are many substantially equivalent descriptions. Such equivalent descriptions include, but are not limited to, those resulting from renaming the described syntactic elements or from applying known grammatical transformations to the presented syntax. This invention comprehends also these substantially equivalent descriptions.

The Action Language Component

The action language includes certain preferred base-level features: an assignment statement; sequencing statements such as "if" and "while" constructs; a tuple output statement; string and numeric expressions; string, numeric, and boolean operators; and certain built-in functions. It will be apparent to those of skill in the art that a base-level action language of equivalent semantic expressive ability can be constructed with slightly different choices of features. For example, the while statement can be replaced by a goto statement. The action language component of this invention comprehends such known equivalent formulations of the semantics disclosed. Further, in optional embodiments, the preferred base-level features can be augmented with such additional features as: additional sequencing statements such as "for" or "repeat" loops; user defined functions; additional string, numeric, and boolean expressions and operators such as are found in C or C++; additional built-in functions; and array variables. Such additional features can be added to the preferred base-level language in known manners. See, e.g., Aho et al., 1986, *Compilers Principles, Techniques, and Tools*, Addison Wesley Publishing Co.

The syntax of the preferred base-level action language is given by the following grammar expressed in a standard notation.

```
Statement ::=
    $VariableName "=" Expression ";"
    |   "if" Expression Statement [ "else" Statement ]
    |   "while" Expression Statement
    |   "{" Statement* "}"
    |   "output" "(" [ Expression {","Expression }* ] ")" ";"
Expression ::=
    string-constant
    |   float-constant
    |   $variableName
    |   Expression op Expression
    |   "(" Expression ")"
    |   functionName "(" [ Expression {","Expression }* ] ")"
```

Thus, the action language component is defined in terms of statements and expressions. A statement can be: an assignment statement, which assigns a new value to a scalar variable; an if statement; a while loop; a compound statement, which is a sequence of other statements enclosed by "{" and "}"; or an output statement. Except for the output statement, the statements function in the same manner as in other procedural programming languages, e.g., C, C++, or Pascal. For the if and while statements, the conditional argument is considered true if it is either a non-zero number or a non-null string, i.e., not the empty string "". The OUTPUT statement allows a wrapper to return information matched in responses from the information source to the netbot module executing the wrapper. For example, executing the statement "output (arg__1, . . . , arg__n)" causes the tuple <arg__1, . . . , arg__n> to be returned from the wrapper to the netbot.

An expression can be: a string constant, which is a symbol string surrounded by quotation marks; a floating point number; a variable name, which is a name or an integer preceded by a dollar sign; an infix operator applied to two surrounding sub-expressions; a sub-expression, which is enclosed in "(" and ")"; or a call to a built-in function.

Further, the language provides operators standard in procedural programming languages, including the following: arithmetic operators ("+", "−", "*", "/"); numeric comparison operators ("<", "=", ">", "<=", ">=", "!="); string comparison operators ("lt", "eq", "gt", "le", "ge", "ne"); a string concatenation operator ("."); and boolean operators ("&&", "||", "!"). These operators have the following semantics:

1) +, −, *, /: perform the indicated arithmetic operation on the surrounding expressions;
2) .: concatenate the surrounding strings;
3) ==, <=, >=, <, >, !=: perform the indicated numeric comparison of the surrounding numbers and return the floating point values 0.0 or 1.0 accordingly;
4) eq, le, ge, lt, gt, ne: perform the indicated character-by-character comparison of the ASCII codes of the surrounding strings and return the floating point values 0.0 or 1.0 accordingly;
5) !: return 1 if argument is the number 0 or the string "", otherwise return 0;
6) &&: evaluate the first argument, if the first argument is zero or "", stop and return that value, else evaluate the second argument and return the latter value;
7) ||: evaluate the first argument, if first argument is neither zero nor "", stop and return that value immediately; else evaluate the second argument and return the latter value.

These operators have the following precedence in order from highest to lowest:
1. any expression inside parentheses (highest precedence)
2. *, /
3. +, −, .
4. ==, <=, >=, <, >, !=, ne, eq, le, lt, gt, ge
5. ! (boolean not)
6. && (boolean and)
7. || (boolean or) (lowest precedence)
All operators are left-associative.

No variable declarations are needed. First, all variables in the action language are distinguished by being preceded by a "$". Those special variable denoting sub-strings matched by regular expression consist of a "$" followed by an integer, e.g., $0 or $1. Second, at run time, automatic type conversions, between string and floating point types, is done dynamically. If an operator expects a number but gets a string, the string is converted to a number by calling the C library function atof( ), which converts the ASCII representation of a number into its internal floating-point representation. If an operator expects a is string argument but gets a number it uses the C library function sprintf( . . . ,"%r") to convert it to a string. Third, referenced variables that have not yet been assigned are set the default values 0 or "", as appropriate.

The action language component has several built-in functions. The following are preferred base-level built-in functions.

1) argc( ), argv( ): when a netbot executes a wrapper, it can pass the wrapper one or more arguments. These usually represent query parameters, query words, or query keywords supplied by the user. These arguments are accessed from within the wrapper language by the functions argc( ), which returns the number of arguments passed to the wrapper, and argv(n), which returns the n-th argument.

2) fetch( ): This function preferably interfaces with the I/O module to transfer a string containing the network address of an information source and perhaps query parameters over a network to the addressed information source according to the proper protocol, and returns a string containing the response of the information source. Wrappers use this function to query information sources and retrieve pages.

3) parse(<string>,<nonterminal>): This function takes a string and attempts to match it to the regular expression corresponding to the given <nonterminal>, as defined by the regular expression language component of the WDL. This function returns "1" if the match was successful, or "0" if the string did not match the regular expression. Wrappers use this function to parse the response of an information source.

An exemplary wrapper includes the following sequence of action language statements. First is a series of statements using argc( ) and argv( ) to obtain the user query parameters and to initialize a string variable, e.g., $url, with a string containing the URL of the appropriate page at the information source together with an appropriately formatted query. Next, the assignment statement "$html_text=fetch ($url)" fetches the query-response page into another string variable, e.g., $htm,_text. Finally, the function parse($html_text, ) attempts to match the returned html text with the regular expression, , which describes the sought page.

The Regular Expression Language

The regular expression ("reg-exp") component of the WDL matches strings against regular expressions. It has been found that regular expressions are convenient to describe the format of responses returned from a wide range of information sources. However, the reg-exp language of this invention is capable of matching this information so that relevant fields can be extracted in a more rapid and more convenient manner than can prior languages and systems, such as AWK or Perl. The regular expression component includes novel facilities that solve the problems with prior matching systems, and thereby, permit its use by netbots.

A first novel facility allows the specification of regular expressions to be broken into pieces in a manner similar to a context-free grammar, which specifies a language by a set of rules for nonterminals in the grammar. See, e.g., Aho et al., 1986, *Compilers Principles, Techniques, and Tools*, Addison Wesley Publishing Co., section 4.2. Writing a single regular expression to represent the format of a page from an information source, as is required in prior systems, often results in a very large and cumbersome expression, one which is difficult to write, understand, and maintain. To solve this problem of existing systems, the reg-exp component specifies a regular expression by a set of rules for components of the regular expression. These components are labeled by nonterminals. However, in contrast to context-free grammars, the set of rules in the reg-exp component are not allowed to be recursive or mutually-recursive. In other words, the rule for a particular nonterminal cannot directly or indirectly refer to other rules which refer to that particular nonterminal.

The following exemplifies the use of a set of rules and nonterminals. A top-level nonterminal defining an information response can be:

::= <head> <item>* <tail> END.

which specifies that the response is a page consisting of a head, followed by zero or more items, followed by a tail. The keyword "END" denotes the end of a rule. The second-level nonterminals on the right-hand side ("RHS") of this rule, <head>, <item>, and <tail> are defined by their own rules:

| <head> | ::= "Results of your search:\n" END; |
| <item> | ::= "Data: . . .\n" END; |
| <tail> | ::= "No more results\n" END. |

To execute these rules, the reg-exp component compiler substitutes into the RHS of  the RHSs of the rules for <head>, <item>, and <tail>. The result is as if the wrapper contained the-large, cumbersome composite top-level rule:

|  | ::= "Results of your search:$n" ("Data: . . .$n")* "No more results$n" END |

If the second-level rules had contained further nonterminals on their RHSs, the compiler would continue making appropriate substitutions until there are no more nonterminals on the RHS of the composite rule for the top-level rule. Because of the lack of recursion or mutual recursion, this substitution terminates.

A second novel facility permits skipping groups of characters in a string without backtracking. In prior regular expression matching systems, this quite common requirement is implemented in a manner that requires the storage of many backtracking points on a stack and can lead to extensive backtracking. For example, the prior art Perl idiom ".*", which matches any number of occurrences of any character, or the Perl idiom "[^\d]*\d, which matches all non-digit characters up to the first occurrence of a digit, can cause extensive back-tracking during a match. This is inefficient and not preferable, since information responses should be rapidly parsed. See, e.g. Schwartz, 1993, *Learning Perl*, O'Reilly & Associates, Inc., chapter 7. To solve this problem, the reg-exp component introduces simple and direct syntax for this common idiom:

stuff "literal-string"

where "stuff" is a reserved word. Stuff is defined to match all characters from the current character, up to but not including, the first occurrence of the string "literal-string," which must be a string literal. This construct allows a compact, efficient, backtrack-free implementation of this common and important idiom.

third novel facility allows relevant data fields to be extracted from arbitrarily complex regular expressions. Action language statements can be embedded in the RHS of a nonterminal for execution whenever that nonterminal is matched and with the variable bindings current at each occurrence of a match of that nonterminal. In the case of the previous example, the definition for <item> can be extended as follows:

<item> ::= "Data:" (stuff) "n" { output($0); } END.

Whenever <item> is matched, $0 is set to the string matched by stuff in the parenthesis, and then the output statement is executed. In this case, $0 gets bound to whatever characters followed "Data:" and preceded the newline character.

Prior systems, for example AWK and Perl, do not have such a facility. Although they do set variables, such as $0, $1, etc., they do so only after matching the single composite regular expression defining . In order words, the entire page is matched before variables are set. Therefore, in AWK and Perl, if there is more than one <item> on the , the relevant data fields in all but the last <item> are lost. The reg-exp component of the WDL solves this problem by allowing specification of actions that are executed multiple times, once for each nonterminal match, with different variable bindings each time.

Turning now to the description of the reg-exp language, it includes certain preferred base-level features: definition of nonterminal regular expressions; embedding action language statements in regular expression rules; operators for expressing alternation and repetition; and literal string match. It will be apparent to those of skill in the art that a preferred base-level reg-exp language of equivalent semantic expressive abilities can be constructed with a slightly different choice of features, and the reg-exp language component of the WDL includes such well-known equivalents. In particular, the reg-exp language comprehends variable renamings and known grammatical transformations applied to the rules below. In optional embodiments, the preferred base features can be augmented with such additional features as: a special disjunction ("||"); repetition for an arbitrary integer; matching to character classes; local string memory; and anchoring characters. Such additional features are standard with the exception of the special disjunction, which causes the listed alternatives to be matched simultaneously as the string is parsed, the first alternative to match being returned. In contrast, the regular disjunction matches each alternative in the sequence listed, backtracking until success is found. The additional features can be added to the base-level language in known manners. See, e.g. Schwartz, 1993, *Learning Perl*, O'Reilly & Associates, Inc.; Aho et al., 1986, *Compilers Principles, Techniques, and Tools*, Addison Wesley Publishing Co.; Hopcroft at el., *Introduction to Automata Theory, Languages, and Computation*, Addison Wesley Publishing Co.

In a further alternative embodiment, declarations could be added to control backtracking in order to improve performance of the regular expression matching. If a certain portion of a rule were known to require no backtracking, that portion can be bracketed with declarations instructing the compiler and interpreter to generate a finite state machine without any provision for backtracking. This permits that portion of the rule to be matched more efficiently than otherwise.

The syntax of the preferred base-level action language is given ny the following grammar expressed in a standard notation.

```
Rule         ::= <nonterminal> "::="Regexp "END"
Regexp       ::= Sequence ("|" Sequence )*
Sequence     ::= Repetition+
Repetition   ::= Term "?"
               | Term "*"
               | Term "+"
               | Term
Term         ::= String_In_Double_Quotes
             | "stuff"
             | "("Regexp")"
             | <nonterminal>
             | Action
Action       ::= "{" Statement* ")"
```

Briefly, a rule specifies a particular <nonterminal>to recognize a particular regular expression. A regular expression can include: disjunctions ("|"); sequences; zero or more repetitions ("+"); one or more repetitions ("+"); and zero or one repetition ("?"). Terms can be: literal strings enclosed by double quotation marks; the special symbol stuff; parenthesized regular expressions; nonterminals, which must be defined another rule; or statements written in the action language.

The Wrapper Description Language

A complete wrapper description can be:
WrapperDescription ::= Statement Rule*

Thus the preferred WDL entities include a statement in the action language, which is typically a sequence of action language statements, followed by an optional set of rules in the reg-exp language, which define a regular expression for matching a response returned from information sources.

To execute a complete wrapper description, the statement is executed as is described subsequently. Typically, the statement contains calls to the built-in Functions fetch( ) and parse( ), among others. The parse( ) built-in function attempts to match a response returned by fetch( ) by invoking a nonterminal defined by the appended rules, each of which defines a regular expression. If the regular expression match is successful, all the action language statements typically embedded in the regular expression are executed, typically some action statements embedded in lower level nonterminals are executed multiple times with the operand bindings current at each occurrence of a match, and the parse( ) function returns the value "1". If the match is unsuccessful, none of the embedded statements are executed, and the parse( ) function returns the value "0".

5.5.2. IMPLEMENTATION OF THE WDL COMPONENTS

The preferred implementation of the WDL is described in this section under the following headings: (1) parsing regular expression rules, (2) intermediate code generation for regular expressions, (3) run-time interpretation of regular expressions, (4) action language code generation and run-time interpretation. It is understood that this preferred implementation of the WDL is exemplary. It is known to those of skill in the art that alternatives exist to the implementation described herein. For example, the processes described can be implemented differently, e.g., with different variables and different orderings of the individual steps. Also, the processes may implement alternative algorithms to achieve the same effects for, e.g., string matching. For a further example, the described implementation discloses processes of interpreting various intermediate codes. Different intermediate codes can be used. For the regular expression language, different types of nodes are possible including, e.g., nodes having a variable list of successor states to avoid having to maintain a backtracking stack of successor states. For the action language, instead of the disclosed address-based intermediate code, equivalently a reverse Polish stack-based intermediate code could be used. Finally, instead of interpretation, it is possible to compile directly to a machine language using the disclosed syntax-directed methods.

In the remainder of this section, a parse tree node that has label "l", contains data "d", and has child nodes "c_1, . . . , c_n" is denoted by "l<d;c_1, . . . ,c_n>". These parse tree nodes can be constructed and referenced in way known in the art, e.g., by a pointer to a data area containing node data.

Parsing Regular Expression Rules

The first step in the preferred implementation of compiling a wrapper description is parsing the rules of the reg-exp language and the statements of the action language. The input to this step are the rules of the reg-exp language defining the regular expression to match. The output from this step is intermediate code in the form of a set of parse trees, one parse tree for the top-level rule and additional parse trees for each lower-level rule.

In a preferred embodiment, the process of this step is performed by parsing according to a recursive descent parser and emitting the parse tree according to a syntax-directed translator. Construction of a recursive descent compiler for the previously described syntax of the reg-exp language is well known to those of skill in the art. For example, it is clearly disclosed with examples in such textbooks as Aho et al., 1986, *Compilers Principles, Techniques, and Tools*, Addison Wesley Publishing Co. at section 2.4 and 4.4. Syntax directed construction of parse trees is covered with examples in section 5.2. This invention is not limited to this preferred embodiment. Alternative parsing techniques are known in the art, and this invention comprehends embodiments using such techniques, such as LL or LR parsing. See generally Aho at al. at chapter 4. This invention also comprehends alternative techniques of intermediate code generation known in the art. See generally Aho et al. at chapter 5.

The specification for the syntax-directed analysis includes rules for the parse-tree nodes to be created when each syntax rule is recognized by the parser. For each of the previous reg-exp syntax rules the following nodes, labeled by the nonterminal of the rule, are created:

1. Rule: Create the node "Rule <nonterminal-name; node-for-regexp>." This is the node for an entire rule labeled with its nonterminal name.
2. Regexp: Create the node "Alternatives <node_for_sequence_1, . . . , node_for_sequence_n>." This is the node for a disjunction ("|") of alternative regular expressions, which are tested for a match in the order listed, the first successful match being returned.

3. Sequence: Create the node "Sequence <node_for_repetition_1 . . . , node_for_repetition_n>." This is the node for a sequence of regular expression patterns each of which must sequentially match.
4. Repetition: Create the node "Repetition <type; node_for_term>." This is the node for a repetition, where type is one of "?" (0 or 1 repetition), "+" (1 or more repetitions), or "*" (0 or more repetitions).
5. String_In_Double_Quotes: Create the node "String <literal_string>." This is the node to match a literal string.
6. Stuff: Create the node "Stuff<>" for the reserved word "stuff."
7. (Regexp): Create the node "Sequence <OpenParenthesis<i>, node_for_Regexp, CloseParenthesis<i>>." This is the node which causes assignment to a sequentially numbered variable on a match by "Regexp." The node "OpenParenthesis<n>" is a node representing the n'th open parenthesis that is encountered in sequentially parsing the RHS of the current rule. The rule "CloseParenthesis<n>" is a node represented the corresponding n'th close parenthesis encountered.
8. <nonterminal>: Create the node "Nonterminal <nonterminal_name>," for an instance of a nonterminal.
9. Action: Create the node "Action <node_for_action language_statement>." This is a node for an instance of an action language statement in which the node_for_action_language_statement represents intermediate code for the action language statement.

These rules, which are executed when the parser recognizes the corresponding reg-exp language syntax rule, cause the generation of a parse tree, which is formed from the listed node types linked in a true structure. This parse tree is input to subsequent steps of this process.

Intermediate Code Generation for Regular Expressions

Code generation in the preferred embodiment includes the following three steps:

1. Special preprocessing of stuff nodes;
2. Eliminating occurrences of nonterminals in the RHS of the top-level nonterminal; and
3. Converting the resulting RHS of the top-level rule into a finite state automaton ("FSA"). These steps are, first, generally described, and second, described in detail.

First, preprocessing of stuff nodes is necessary to later use the preferred postorder traversal method of FSA generation. As an FSA cannot be built for a stuff element alone, it is necessary to build an FSA for the combination of a stuff node and the literal string node that must follow each stuff element, only open and close parentheses can intervene between a stuff node and its following literal string. To do so, the parse tree is traversed and each stuff node is merged with the following literal string by replacing both nodes with a new Stuff_And_String node. The new node also accounts for any intervening parentheses.

The second step in code generation substitutes all is nonterminals in the RHS of the top-level nonterminal with their respective RHSs to generate a single composite rule for the overall regular expression. During this substitution, it is necessary to renumber occurrences of variables in action language statements.

For example, consider the wrapper

|  | ("dave") ("bill") <a> ("dan") { output($2); } END |
| <a> | "oren" (stuff "cody") {output($0); } END |

Here, $2 in the output statement in  references ("dan"), while $0 in the output statement in <a> references (stuff "cody"). After substitution, if variables in the output statement were not renumbered, the RHS of  would be expanded as follows:

|  | ("dave") ("bill") "oren" (stuff "cody") { output($0); } ("dan") { output($2); } |

Here, however, $0 refers to ("dave") instead of (stuff "cody"), while $2 refers to (stuff "cody") instead of ("dan"). To maintain correct variable assignment, the variable references must be renumbered as follows:

|  | ::= ("dave") ("bill") "oren" (stuff "cody") { output($2); } ("dan") { output($3); } |

The third step in the preferred embodiment of the code generation process converts the processed and expanded RHS into an FSA by performing a postorder traversal of the parse tree representing the RHS of the top-level rule, during which each node is in turn converted into an FSA. The FSAs have several types of states, most importantly:

1. Char_branch: Branch to one of 256 possible successor states depending on the current character and advances the current read position;
2. Action: Executes a block of action language statements;
3. Marker: Records the current input string position, plus or minus a certain offset, on a mark stack;
4. Success: When reached, parsing has succeeded;
5. Fail: When reached, the current attempt at parsing has failed, and the FSA must either backtrack to the prior backtracking point or fail if no backtracking points available;
6. Push: Pushes a configuration comprising an FSA state and the current input string position, onto the backtracking stack for later backtracking Code Generation Step 1: Preprocessing The preferred pre-processing of stuff nodes begins by expanding or flattening any nested sequences, i.e., Sequence<> elements nested within other Sequence<> elements. This is done according to the following process:

```
FOR nonterminal PERFORM a POSTORDER traversal of its
parse tree
    At each parse tree node v
        IF (v=Sequence<c_1, . . . , c_n>) THEN
            WHILE (there is an i, 1<=i<=n, such that
            c_i=Sequence<d_1, . . . , d_m>) DO
                Replace node v with a new node
                Sequence <c_1, . . . , c_i-1, d_1, . . . ,
                d_m, c_i+1, . . . , c_n>
```

Next, each occurrence of a stuff node is replaced by a Stuff_And_String node that also accounts for the following literal string and any intervening parentheses. Every occurrence of "stuff" in a wrapper must be followed by a literal string with the semantic result that "stuff" matches all characters from the current position up to, but not including, the first occurrence of the following literal string. Only open and close parentheses can intervene between stuff and the literal string. In the preferred embodiment, this replacement is preferably performed according to the following process:

```
FOR nonterminal PERFORM a POSTORDER traversal of its
parse tree.
    At each node v of the parse tree
        IF (v=Sequence<c_1, . . . , c_n>) THEN
            WHILE (there is an i, 1<=i<=n, such that
            c_i=Stuff<>) Do
                Let j be the smallest j>i such that
                c_j=String<s>for some string s.
                IF there is no such j THEN signal an
                error.
                ELSE IF (any element ck (where i<k<j) is
                NOT either an OpenParenthesis or
                CloseParenthesis) THEN signal an
                error
                /* cj is node for the string */
                ELSE replace node v with a new node =
                Sequence <c_1, . . . , c_i−1,
                Stuff_And_String<c_j; c_i+1, . . . ,
                c_j−1>, c_j+1, . . . , c_n>
```

This process merges the stuff node, the literal string node, c_j, and any intervening parentheses nodes, . . . c_j-1, into the single node Stuff_And_String<the-string; c_i+1, . . . , c_j-1>.

Code Generation Step 2: Substitution And Variable Renaming

Having completed pre-processing, nonterminals on the RHS of the top-level rule are preferably substituted and any action statement variables renumbered. Substitution and variable renumbering preferably use a process having two functions, EXPAND_REGEXP and EXPAND_ACTION and a global variable PAREN_COUNT. EXPAND_REGEXP is called recursively to substitute for RHS nonterminals, starting with a call to the top-level nonterminal. PAREN_COUNT is initialized to 0, and as substitution proceeds, it is incremented for each "(" encountered. PAREN_COUNT thus has a count of the total number of "("s encountered so far. Then during substitution, parentheses encountered are renumbered from their prior number to the current value of PAREN_COUNT and variables in action statements are renumbered in a corresponding fashion. For example, if PAREN_COUNT is currently 8, an OpenParenthesis<2> node is replaced by an OpenParenthesis<8> node, and an output($2) statement is replaced by an output($8) statement. EXPAND_ACTION performs action statement variable renumbering. These processes are as preferably performed according to the following:

```
GLOBAL VARIABLE integer PAREN_COUNT;
FUNCTION EXPAND_REGEXP ( <nt>: nonterminal) : RETURNS a
parse tree with renumbered variables
    /* an array of integers with new variable numbers
    /*
    LOCAL VARIABLE new_names[]
    LET T = parse tree for the RHS of rule for <nt>
    PERFORM a PREORDER traversal of T.
        At each node v of tree T
            IF (v=OpenParenthesis<i>) THEN
                new_names[i] = PAREN_COUNT;
                REPLACE node v with
                    OpenParenthesis<PAREN_COUNT>
                    PAREN_COUNT = PAREN COUNT + 1;
            ELSE IF (v=CloseParenthesis<i>) THEN
                REPLACE node v with
                    CloseParenthesis<new_names[i]>
            ELSE IF (v=Nonterminal<x>) THEN
                REPLACE node v with EXPAND_REGEXP(x)
            ELSE IF (v=Action<x>) THEN
                REPLACE node v with EXPAND_ACTION (x,
                    new_names[])
FUNCTION EXPAND_ACTION (T : parse tree T for action
    language statement; new_names[]) : RETURNS a parse
    tree with renumbered variables
    PERFORM a PREORDER traversal of the parse tree T.
    At each node v,
        IF (v denotes variable name $i (i an integer)
        THEN
            REPLACE node v with a new node with $i
            replaced by $(new_names[i]).
```

Code Generation Part 3: Creating A Finite State Automata

The final step in the preferred embodiment of code generation creates an FSA representing the substituted and processed regular expression. Although algorithms for creating such FSAs are known, they have not in the past provided facilities, for example, for embedding action language statements in such FSAs. Accordingly, the following description focuses on those new features of the preferred embodiment of this process that are directed to supporting action language statements and the other novel features of the reg-exp language.

An FSA output from this process starts its execution in an initial state with an input pointer set to the start of the input string and then repeatedly executes one of six basic procedures according to its current state. These procedures set a new current state and typically effect one or more of the data structures accessed by the FSA. The six types of states and their procedures are as follows:

(1) Char_branch<next_state_0, . . . , next_state_255>: When the current state is a char_branch state, the next state is selected according to the ASCII value, i, of the current input character as next_state_i, and the input pointer is advanced to the next character in the input string.

(2) Marker-<num, open/close_flag, offset, next_state>: When the current state is a marker state, a record is pushed on a run-time stack known as the mark stack that contains the character position of a parenthesis encountered in the input string plus the indicated offset and an indication of whether this parenthesis is open or close, and the next state is set to next_state. An exemplary mark can push a record indicating that the fifth open parenthesis occurred at the current input position.

(3) Action<compiled_action_statements, next_state>: When the current state is an action state, those action language statements represented by compiled_action_statements are executed and the next state is set to next_state.

(4) Success<>: When the current state is the success state, a string has been successfully matched and this FSA terminates.

(5) Push<state, next_state>: When the current state is a push state, the current configuration of the FSA is pushed onto a run-time stack known as the backtracking stack, and the next state is set to next_state. An FSA configuration is a record containing identification of at least the current state together and the current position in the input string. Push is used to support the non-deterministic constructs in the regular expression language. An exemplary non-deterministic construct is the disjunction "reg-expr1 |reg-expr2," which is matched by an FSA that, first, pushes a backtracking state onto the backtracking stack, then two, attempts to run the FSA corresponding to reg-expr1; if that fails, then it backtracks and (c) attempts to run the finite state machine corresponding to reg-expr2.

(6) Failure<>: When the current state is the failure state, a backtrack record is popped off the backtracking stack and the next state and current input pointer are set to the contents of the backtrack record. If the backtracking stack is empty, the FSA has failed to match the input string and terminates.

Creation of the FSA for an input regular expression is done using a postorder traversal of the previously produced parse tree. As the parse tree is traversed, to each node v is attached a finite state machine that matches the sub-expression represented by the sub-tree rooted at v. This attached finite state machine is the value of the variable v.machine. The final FSA output is the FSA that is attached to the root of the parse tree when the creation process completes.

During the traversal, certain finite state machines are created in accordance with methods already known to those of skill in the art. These machines recognize standard regular expression constructs and can be constructed by known methods. General references for the creation of such standard finite state machines include the following: Aho et al., 1974, *The Design And Analysis Of Computer Algorithms*, Addison Wesley Publishing Co., chapter 9; Aho et al., 1986, *Compilers Principles, Techniques, and Tools*, Addison Wesley Publishing Co., chapter 3; Hopcroft et al., 1979, *Introduction to Automata Theory, Languages, and Computation*, Addison-Wesley Publishing Co., Section 2.5; Sedgewick, 1990, *Algorithms in C*, Addison-Wesley Publishing Co., chapter 16.

Further the process disclosed adopts certain construction methods that can advantageously by changed in alternative embodiment. For example, the machine representing a literal string can be constructed according to the Boyer-Moore or other string matching algorithm. See, e.g., Sedgewick at chapter 19.

The preferred process is:

```
PERFORM a POSTORDER traversal of the tree.
  At each node v, Do:
    IF (v=OpenParenthesis<n>) THEN
      SET v.machine = Marker<n, "open", 0,
        Success<>>
    ELSE IF (v=CloseParenthesis<n>) THEN
      SET v.machine = Marker<n, "close", 0,
        Success<>>
    ELSE IF
    (v=Action<node_for_the_action_language_statements>)
    THEN
      SET v.machine =
        Action<compiled_action_statements,
        Success<>>
    ELSE IF (v=String<literal_string>) THEN
      SET len = length (the-string)
      FOR i = 1 to len DO
        branch_state[i] = Char_branch <s_0, s_1,
        . . . , s_255>, where all the s_j's are
        Failure<>EXCEPT the s_j where j is
        the ASCII code for the i'th
        character of the-string which is
        Success<>
      SET v.machine = MAKE_SEQUENCE
        (branch_state[1], . . . ,
        branch_state[len]).
```

```
  -continued
  ELSE IF
  (v=Stuff_And_String<the-string,par_1, . . . , par_k>)
  THEN
  /* m_1 can be constructed according to known
  methods disclosed in the previously cited
  references */
    SET m_1 = a finite state machine that scans
    the input string for the first occurrence of
    the-strIng and stops as soon as it comes to
    the end of this first occurrence.
    FOR i = 1 to k DO
      SET par_i.machine = marker state
      appropriate to parenthesis par_i and
      having an off set of
      -length (the-string).
    SET v.machine = MAKE_SEQUENCE (m_1,
      par_1.machine, . . . , par_k.machine).
  ELSE IF (v=Sequence<element_1, . . . , element_k>)
  THEN
    FOR i = 1 to k DO
      SET element_i.machine = machine
      constructed according to this
      process for element_i
    SET v.machine = MAKE_SEQUENCE
      (element_1.machine, . . . ,
      element_k.machine)
  /* a disjunction, "|" */
  ELSE IF (v=Alternatives<element_1, . . . , element_k>)
  THEN
    FOR i = 1 to k DO
      SET element_i.machine = machine
      constructed according to this
      process for element_i
    SET v.machine = element_k.machine
    FOR i = k-1 downto 1 DO
      v.machine = Push<v.machine,
      element_i.machine>
  /* type is "?", "+", or "*" */
  ELSE IF (v=Repetition<type, element>)) THEN
    SET element.machine = machine constructed
    according to this process for element
    SET v.machine = a finite state machine
    constructed according to methods
    disclosed in the previously cited
    references for this type of repetition
    element.machine
```

This process uses a MAKE_SEQUENCE function that builds a composite machine from a series of sub-machines. The composite machine executes each of the sub-machines in sequence until one sub-machine fails, in which case the composite machine also fails, or all the sub-machines succeed, in which case the composite machine succeeds. In other words, the composite machine runs the first sub-machine; if that succeeds, it runs the second; if that succeeds, it runs the third, and so on. If any sub-machine fails, i.e., reaches a Failure<>state, then composite machine also fails.

```
FUNCTION MAKE_SEQUENCE (machine m_1, m_2, . . . , m_k)
  RETURNS machine.
    new_m m_1;
    FOR i = 2 to k DO
      Traverse the states of new_m and replace
      any Success< >states with m_i
    RETURN new m
```

This concludes the preferred construction of FSAs representing regular expressions from the reg-exp language of this invention. Next, the FSA execution is described.

Run-Time Interpretation of Regular Expressions

In a preferred embodiment, the FSA representing a regular expression is executed by interpreting the structure created in the previous code generation steps. The interpreter preferably accesses several data structures including the current state of the FSA, a pointer to the current character position of the input string, a backtracking stack and a marker stack. The backtracking stack contains records characterizing the state of interpretation of the FSA and is used in a manner known in the art to implement backtracking, in case an attempted partial match of the input string fails. Configuration records include the current state and the current input position. In an alternative embodiment, push states can be avoided by implementing states with a list of possible next states.

The preferred implementation of the novel variable binding and action statement features of the reg-exp language of this invention utilizes an additional stack, the mark stack. The semantics of these features require that no actions be executed until the entire regular expression matching process succeeds. Upon success, all actions are then executed with the variable bindings that occurred during parsing. This means that a single variable, e.g. $1, can have different bindings in the same action statement which can be executed multiple times on match success.

This semantics is implemented in the preferred embodiment using the mark stack in the following manner. When the current interpreted state is an Action<> state, the action language statement is not immediately executed. Rather the action statement code is pushed onto the mark stack. Similarly, when the current state is a mark state, which represents a parenthesis in the regular expression definition, the information present in the mark state is pushed onto the mark stack. This information permits finding the position in the input string of the beginning or ending of a current variable binding. To prevent execution of action language statements encountered during a failed attempted partial match, the mark stack is popped to an appropriate level when the FSA backtracks. Thus, the machine configuration and the configuration record on the backtracking stack further includes the current position in the mark stack.

Action language statements are executed upon final match success by scanning the mark stack from bottom to top. In this scan, variable bindings are set as indicated by mark state records and actions are executed as indicated by action state records. In case of match failure, no action language statements are executed.

In more detail, an embodiment of the preferred implementation functions as follows:

```
GLOBAL VARIABLE current_state = initialized to the
initial machine state
GLOBAL VARIABLE input_pos = initialized to the address
of the beginning of the input string
GLOBAL VARIABLE BT_STACK = initialized to an empty stack
GLOBAL VARIABLE MARK_STACK = initialized to an empty
stack
REPEAT UNTIL one of the following clauses exits
CASE (current_state) IS
    Char_branch<state_0, . . . , state_255>:
        current_state = state_(ASCII value of the
            current input character)
        input_pos = input_pos + 1
    Marker<num, open/close_flag, offset, nextstate>:
        push ("mark", num, open/close_flag,
            input_pos+offset) onto MARK_STACK
        current_state = nextstate
    Action<complied_action_code, nextstate>:
        push ("action", compiled_action_code) onto
            MARK_STACK
        current_state = nextstate
    Push<state, nextstate>:
        push (state, input_pos, height(MARK_STACK))
```

-continued

```
        onto BT_STACK
        current_state = nextstate
    /* exit the REPEAT statement on final success */
    Success<>: GOTO done
    Failure<>:
        /* match finally fails if backtracking is
        attempted and the backtrack stack is empty */
        IF BT_STACK is empty THEN
            RETURN "fail"
        ELSE
            pop BT_STACK record into variables st,
            ip, msh
            current_state = st
            input_pos = ip
            pop MARK_STACK down to height msh
END CASE
/* when parsing succeeds, scan MARK_STACK and execute
actions with variable bindings indicated by the marks */
done:
LOCAL VARIABLE open_marks[], close_marks()
FOR element = bottom of MARK_STACK up to top of
    MARK_STACK DO:
        IF (element=("mark",num,"open",pos)) THEN
        SET open_marks[num] = pos
        IF (element=("mark",num,"close",pos)) THEN
        SET close_marks[num] = pos
        IF (element=("action",compiled_action_code)) THEN
        SET values of $0, $1, . . . , $n to the positions
        in the input string indicated by
        open_marks[n] and close_marks[n]
        RUN compiled_action_statement using these
        bindings of $0, $1, . . . , $n
END FOR
/* match succeeded and all action executed */
RETURN "succeed"
```

For example, in the preceding FOR loop, the binding of $2 is set to the sub-string of the input string beginning at open_marks[2] and ending at close_marks[2].

Action Language Code Generation and Run-Time Interpretation

In a preferred embodiment, action language statements are compiled into a variable length bytecode-type of intermediate language that is executed at run-time by a bytecode interpreter. The previously described action language syntax is parsed by any appropriate known parsing technique, for example by LL or LR parsing. Adequate parsing techniques are presented with examples in Aho et al., 1986, *Compilers Principles, Techniques, and Tools*, Addison Wesley Publishing Co., chapter 4. During parsing all variables occurring in the wrappers are assigned unique numbers. A preferred such assignment assigns sequential positive integers to named variables, e.g., $x, $abc, in the order they are encountered, and assigns sequential negative integers to the numeric variables denoting matched sub-strings, e.g., $0, $1, $2, etc., the numeric variable $i being assigned the number $-(i+1)$.

Intermediate code is generated by known syntax-directed translation techniques. Adequate syntax directed translation techniques are presented with examples in Aho et al. at chapter 8. The preferred intermediate code is presented below. In this presentation, intermediate language instructions have the format of an instruction code, with optional modifying information, followed by zero of more arguments. Variables are denoted by <var> where var is the 2-byte integer coding of the variable. Relative branch offsets are encoded as 4-byte integers. All branches are relative to the current instruction address, i.e., the address of the branch instruction itself, so the bytecode is relocatable.

1. Function Calls:

Encoding: 0 funcode numargs <var_0> <var_1>. . . <var_numargs>

Meaning: var0 is assigned the result of the function identified by "funcode" on the arguments var_1, . . . , var_numargs of number "numargs." Each built-in function, e.g. agrc, argv, etc., and each operator, e.g., "+", "−", "*", etc., of the language has its own unique integer "funcode".

2. Branch Instructions:

Encoding: 1 <offset> <var0>

Meaning: if var0 is true, branch by amount offset relative to the branch instruction Encoding: 2 <offset> <var0>

Meaning: if var0 is false, branch by amount offset relative to the branch instruction Encoding: 3 <offset>

Meaning: always branch by amount offset relative to the branch instruction

3. Load Constant Instructions:

Encoding: 4 <var0> <null-terminated-string>

Meaning: var0 is assigned the null-terminated-string constant

Encoding: 5 <var0> <floating-point-constant>

Meaning: var0 is assigned the floating-point-constant

4. Move Instructions:

Encoding: 6 <var0> <var1>

Meaning: var0 is copied from var1

5. Output Instructions:

Encoding: 7 <var0>

Meaning: outputs one item var0 to the current tuple

Encoding: 8

Meaning: terminates the current tuple, causes it to be returned to the netbot

6. Parsing Instructions:

Encoding: 9 <var0> <var1> <address of the finite state machine for <nt>>

Meaning: var0 is assigned the result of the parse of var1 according to the regular expression denoted by <nt>

7. Exit Instructions:

Encoding: 10

Meaning: exits the current action language block

In alternative embodiments, different intermediate codes or even no intermediate code can be used. For example, instead of previously disclosed address-based intermediate code, equivalently a reverse Polish stack-based intermediate code could be used. Optionally, no intermediate code is used, and action language statements are compiled directly to a machine language. Both these alternative can be implemented by using the disclosed syntax-directed methods. See, e.g., Aho et al.

Execution of wrapper actions is performed in a preferred embodiment in several steps. First, memory is allocated to store all variables and variable values. The number of variables is known after the action statement have been parsed. All variables are initialized to an unassigned value. Next, a pointer CURRENT_INSTRUCTION is initialized to point to the first instruction of the bytecode to be executed. Then, the interpreter enters a loop which retrieves the bytecode pointed to by CURRENT_INSTRUCTION, performs the coded simple action according to the bytecode language previously described, and updates CURRENT_INSTRUCTION to point either to the next instruction, or for taken branch instructions, is modified by the offset value. The interpreter finishes execution upon encountering an exit instruction.

The parse built-in function is executed at run-time by calling the FSA interpreter to interpret the compiled regular expression code specifying the finite state machine. Output (a_1, . . . ,a_n) statements are translated and then executed by executing bytecode instruction code 7 for each variable in the output list followed by a bytecode instruction code 8 that terminates the current tuple, i.e., marks the end of the output statement.

6. SPECIFIC EMBODIMENTS. CITATION OF REFERENCES

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims.

Various publications are cited herein, the disclosures of which are incorporated by reference in their entireties.

What is claimed is:

1. A wrapper description language method comprising recognizing a string by scanning the string as a regular expression written in a regular expression language, the regular expression language capable of specifying an entire regular expression in terns of component regular expressions such that, upon recognition of one component regular expression of the entire regular expression, actions can be executed with variables bound as of the time of recognition of the component regular expression, the actions actually being executed only if the entire regular expression is also recognized.

2. The wrapper description language method of claim 1 further comprising the step of executing one or more statements written in an action language, the action language capable of specifying the actions of operators on variables, the actions of functions on variables, and of the sequence of statements the statements of the action language being further capable of being embedded in the regular expression language for specifying the actions occurring on the recognition of the component regular expressions.

3. A computer readable medium containing computer executable instructions for causing one or mote computers to perform a wrapper description language method comprising recognizing a string by scanning the string as a regular expression written in a regular expression language, the regular expression language capable of specifying an entire regular expression in terms of component regular expressions such that, upon recognition of one component regular expression of the entire regular expression, actions can be executed with variables bound as of the time of recognition of the component regular expression, the actions actually being executed only if the entire regular expression is also recognized.

4. A computer program product stored on a computer readable medium, and including computer executable instructions for causing one or more computers to interpret strings written in a regular expression language by, performing the steps of:

receiving a string written in the regular expression language;

scanning the string to recognize a plurality of component regular expressions;

binding variables defined in the component regular expressions as the component regular expressions are recognized: and upon recognition of an entire regular expression containing the plurality of recognized component regular expressions, executing at least one action using the bound variables from the component regular expressions.

* * * * *